US012717787B1

(12) United States Patent
Lucas et al.

(10) Patent No.: US 12,717,787 B1
(45) Date of Patent: Aug. 25, 2026

(54) OPTIMIZING DATABASE JOIN OPERATIONS USING QUANTUM ANNEALING, SWARM INTELLIGENCE, AND GENETIC ALGORITHMS

(71) Applicant: Bank of America Corporation, Charlotte, NC (US)

(72) Inventors: Jemlin Lucas, Coppell, TX (US); Suryanarayana Adivi, Hyderabad (IN); Pushkar Taneja, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 19/258,369

(22) Filed: Jul. 2, 2025

(51) Int. Cl.
*G06F 16/2453* (2019.01)
*G06N 10/20* (2022.01)
*G06N 10/60* (2022.01)

(52) U.S. Cl.
CPC ....... *G06F 16/24544* (2019.01); *G06N 10/20* (2022.01); *G06N 10/60* (2022.01)

(58) Field of Classification Search
CPC ................................................ G06F 16/24544
USPC ......................................................... 707/714
See application file for complete search history.

(56) References Cited

U.S. PATENT DOCUMENTS

| | | | |
|---|---|---|---|
| 5,255,345 A | 10/1993 | Shaefer | |
| 5,960,428 A | 9/1999 | Lindsay et al. | |
| 8,364,612 B2 | 1/2013 | Van Gael et al. | |
| 10,712,929 B2 | 7/2020 | Rosenberg | |
| 2011/0055199 A1 | 3/2011 | Siddiqui et al. | |
| 2017/0372427 A1 | 12/2017 | Johnson et al. | |
| 2018/0343275 A1* | 11/2018 | Moon | G06F 21/554 |
| 2022/0027767 A1* | 1/2022 | Krishnamoorthy | G06N 3/006 |
| 2022/0108260 A1* | 4/2022 | DaCosta | G06Q 10/063112 |
| 2025/0256864 A1* | 8/2025 | Catledge | G06Q 10/06312 |

OTHER PUBLICATIONS

Mohsin et al. "Dynamic Cost and Ant Colony Algorithm to Optimize Query for Distributed Database Based on Quantum-Inspired Approach." https://www.mdpi.com/2073-8994/13/1/70. Jan. 2, 2021 (Year: 2021).*

* cited by examiner

*Primary Examiner* — Kimberly L Wilson
(74) *Attorney, Agent, or Firm* — Banner & Witcoff, Ltd.

(57) ABSTRACT

Systems and methods are disclosed for optimizing database join operations in large-scale relational databases using an integrated framework of quantum annealing, swarm intelligence, and genetic algorithms. The system employs quantum annealing to learn data distribution patterns, normalizing and transforming data to identify optimal join strategies and correlations across tables. Swarm intelligence predicts access patterns by deploying artificial ants to navigate data blocks, converging on high-relevance areas for prefetching. Genetic algorithms estimate join selectivity, calculating expected record counts to allocate resources efficiently. Learned index structures, dynamically created and tuned based on identified patterns, enhance retrieval speed with minimal storage. Additional features include learned Bloom filters for accurate join candidate selection, predictive page loading to reduce I/O wait times, and join order optimization to minimize intermediate result sizes. This modular, adaptive approach ensures rapid, resource-efficient query responses across diverse applications, such as banking and e-commerce.

20 Claims, 8 Drawing Sheets

OPTIMIZING DATABASE JOIN OPERATIONS USING QUANTUM ANNEALING, SWARM INTELLIGENCE, AND GENETIC ALGORITHMS

TECHNICAL FIELD

The inventions disclosed herein pertain to digital data processing systems and corresponding data processing methods for managing and retrieving data from large-scale databases. Specifically, the inventions involve techniques for optimizing database join operations by leveraging quantum annealing to learn data distribution patterns, swarm intelligence to predict data access patterns, and genetic algorithms to estimate join selectivity, thereby enhancing the efficiency of data retrieval processes. Additionally, the inventions encompass the creation and tuning of learned index structures to facilitate faster data lookup and retrieval, applicable in systems requiring high-performance database management and query processing. These advancements improve the speed and accuracy of data retrieval in complex database environments, particularly those handling voluminous and interconnected datasets.

DESCRIPTION OF THE RELATED ART

In large-scale database systems, particularly those used in sectors like banking and e-commerce, the volume of data stored is immense, often encompassing millions of customer records, transaction histories, and product details. These databases are designed to hold comprehensive information, where a single customer may have multiple accounts, each linked to various products such as loans, insurance policies, or savings accounts. The interconnected nature of this data creates significant complexity, as records are not stored in isolation but are relationally linked across multiple tables. For instance, a customer's profile might be associated with several accounts, each account tied to distinct products, and each product potentially linked to additional transactional or policy-related data. This relational structure, while necessary for comprehensive data management, poses substantial challenges when attempting to retrieve specific information efficiently.

When users, such as customers or service representatives, interact with these databases through online platforms, chatbots, or customer service portals, they often submit queries to access specific details, such as account balances, transaction histories, or product information. These queries typically require the database system to perform join operations, which combine data from multiple tables to produce a cohesive result. However, the sheer volume of data and the complexity of relationships between tables can lead to significant delays in query processing. A single join operation may need to scan millions of records across multiple tables, searching for matching entries, which consumes considerable computational resources and time. For example, retrieving all orders placed by a specific customer in an e-commerce database requires joining customer records with order records, a process that can become sluggish as the dataset grows.

The inefficiency of join operations is exacerbated by the way data is traditionally organized in these databases. To manage large volumes, data is often segmented into blocks or partitions to facilitate storage and retrieval. However, these blocks are not always optimized for the specific queries users submit. When a query is executed, the system may need to access multiple blocks, each containing only a subset of the relevant data, leading to redundant scans and increased processing time. This fragmentation can cause response times to stretch from seconds to minutes, particularly during peak usage periods when multiple users submit queries simultaneously. Such delays degrade the user experience, as customers expect near-instantaneous responses when accessing their account details or product information online.

Historical incidents underscore the severity of these inefficiencies. In one instance in June 2022, a major cloud service provider experienced a 30-minute outage due to a database join query issue. The query, which attempted to join millions of customer records with order records, overwhelmed the system, causing temporary disruptions to several services. Similarly, in October 2022, a retail chain faced connectivity issues and outages across multiple stores because a large-scale join query took an unusually long time to complete, creating a backlog of unprocessed queries. These incidents highlight the real-world consequences of inefficient join operations, including service disruptions, customer dissatisfaction, and operational losses.

Another challenge arises from the repetitive nature of user queries. In many cases, customers or systems submit similar or identical queries multiple times, such as requests for loan details or account statements. Despite the similarity, traditional database systems often process each query as if it were new, failing to leverage historical patterns to optimize retrieval. For example, a customer requesting loan information might receive a response in one minute for the first query, but subsequent identical queries still require the same processing time, as the system does not cache or prioritize relevant data blocks based on prior access patterns. This lack of optimization results in consistent delays, even for predictable query types, further frustrating users who expect faster responses for routine requests.

The inefficiency of join operations also stems from the static nature of traditional indexing methods. Database indexes are designed to speed up data retrieval by providing quick access to specific records, but they are often created based on general assumptions about query patterns. In dynamic environments like banking or e-commerce, where query types and data access patterns vary widely, static indexes may not align with the most frequent or performance-sensitive queries. For instance, an index optimized for retrieving primary account details may be less effective for queries involving secondary accounts or product-specific data, forcing the system to perform full table scans or rely on suboptimal indexes. This mismatch increases query execution time and computational overhead.

Moreover, the selectivity of join operations—the proportion of records that match the join condition—poses a significant hurdle. Estimating join selectivity accurately is difficult in large databases with complex relationships, as it requires predicting how many records from one table will match records in another. Poor selectivity estimates can lead to inefficient query execution plans, where the system either underestimates or overestimates the resources needed, resulting in wasted computational effort or prolonged processing times. For example, if a query joining customer and transaction tables is expected to return a small number of records but actually produces millions, the system may allocate insufficient resources, causing delays or crashes.

The challenges are further compounded during peak operational periods, such as promotional events in e-commerce or financial reporting cycles in banking, when query volumes spike. During these times, the database system faces increased pressure to process a high number of concurrent queries, each requiring multiple join operations. The cumulative effect of inefficient joins, unoptimized data blocks, and static indexes can lead to significant bottlenecks, slowing down response times across the system. Customers may experience delays in accessing critical information, such as order statuses or account balances, while businesses risk operational inefficiencies and reputational damage due to poor service performance.

These issues are not isolated to specific industries but are pervasive across any domain relying on large-scale relational databases. The complexity of data relationships, the volume of records, and the demand for real-time query responses create a universal problem that traditional database management techniques struggle to address. Efforts to mitigate these issues, such as load balancing or query optimization, often provide only incremental improvements and fail to tackle the root causes of inefficiency, such as the inability to dynamically adapt to query patterns or optimize join operations at scale.

The need for a solution to these problems has been long felt and remains unmet, as businesses and customers continue to grapple with slow query responses and system outages in large-scale database environments. For years, industries have sought ways to accelerate join operations, improve data retrieval efficiency, and adapt to dynamic query patterns without sacrificing accuracy or scalability. Existing approaches, such as manual query optimization or hardware upgrades, are costly, time-consuming, and often insufficient for handling the growing complexity and volume of modern databases. The persistent demand for a method to streamline join operations, predict access patterns, and optimize data retrieval in real time reflects a gap that has yet to be filled, underscoring the urgency for an innovative approach to transform database performance and meet user expectations for rapid, reliable data access.

SUMMARY OF THE INVENTION

The inventions provide comprehensive systems and methods for optimizing database join operations in large-scale relational databases, utilizing a novel integration of quantum annealing, swarm intelligence, and genetic algorithms to enhance data retrieval efficiency. This approach targets environments with vast, interconnected datasets, such as those in banking, e-commerce, and other data-intensive sectors, where rapid query responses are essential. The system is organized into three distinct layers, each addressing a specific aspect of data management: learning data distribution patterns, predicting access behaviors, and estimating join selectivity while creating optimized index structures. By combining these advanced computational techniques, the invention achieves significant improvements in query response times, resource utilization, and scalability, offering a transformative solution for managing complex database operations.

The first layer focuses on data distribution learning through quantum annealing, a process that begins with meticulous data preparation. Historical data, encompassing customer profiles, account types, transaction histories, product usage, and query logs, is collected from diverse sources, such as online platforms and physical branch records. This data undergoes normalization to ensure consistency across datasets, addressing variations in formats, scales, or units. For example, transaction amounts in different currencies are standardized, and account types are categorized uniformly. The normalized data is then transformed into a structured format compatible with quantum annealing, such as matrices or relational graphs, to facilitate efficient processing. This preparation phase ensures that the subsequent algorithm operates on clean, well-organized data, maximizing its ability to uncover meaningful patterns.

Quantum annealing, the core of the first layer, leverages principles of quantum mechanics to explore the solution space and identify optimal join strategies. The algorithm initializes with parameters like thermal and solution boundaries, defining the scope of possible data configurations. It then iteratively samples the solution space, probing combinations of data blocks and table relationships to determine the most efficient ways to join related data points. For instance, it might optimize the connection between customer profiles and transaction records, prioritizing paths that minimize retrieval time while ensuring accuracy. This iterative process, akin to cooling in physical annealing, refines the solutions to converge on a global minimum, representing the most effective data distribution strategy.

Pattern identification follows quantum annealing, where the system analyzes the algorithm's outputs to uncover correlations between columns and tables. This step involves generating a detailed relationship graph or matrix that maps connections, such as frequent associations between customers with personal loans and their savings accounts or credit card transactions. These correlations reveal how data is distributed across the database, identifying which tables or blocks are most likely to contain relevant records for specific queries. For example, the system might discover that customers inquiring about loan statuses often request related product details, enabling targeted data retrieval. These insights form the foundation for subsequent layers, guiding the system toward efficient query execution.

The second layer employs swarm intelligence, specifically a swarm artificial intelligence (AI) algorithm, to predict data access patterns dynamically. This layer initializes a population of artificial ants, each representing a potential data block, such as a segment of customer records or transaction logs. These ants navigate the data space, guided by pheromone trails left by previous explorations, which indicate areas of high relevance based on historical query patterns. The initialization process assigns each ant a starting point within the database, ensuring broad coverage of potential data blocks. This collective approach mimics natural foraging behaviors, allowing the system to explore the data landscape comprehensively.

As ants move through the data space, they follow pheromone trails that highlight frequently accessed or highly relevant blocks. For instance, if historical queries often target loan application records, ants prioritize paths leading to those blocks, reinforcing the trails with stronger pheromone signals. This movement is not random but guided by a probabilistic model that balances exploration of new paths with targeting of known high-value areas. The system monitors ant movements in real time, tracking which blocks attract the most activity and adjusting the pheromone trails to reflect current access patterns. This dynamic navigation ensures that the system adapts to evolving user behaviors, such as shifts in query focus during promotional events.

Ant convergence marks the next phase, where ants begin to cluster around specific data blocks, indicating areas of high relevance. The system reinforces these pheromone trails, increasing the likelihood that future ants will follow the same paths. For example, if ants converge on blocks containing first-time borrowers' transaction histories, the system recognizes these as priority areas for data retrieval, streamlining query execution. This convergence process leverages the collective intelligence of the swarm, distilling complex access patterns into actionable insights. By identifying hotspots—blocks frequently accessed for specific query types—the system optimizes resource allocation, ensuring that computational effort focuses on the most pertinent data.

Access pattern identification concludes the swarm AI layer, where the system synthesizes the swarm's findings to pinpoint the most promising data blocks for join operations. Using pheromone concentrations and ant movement data, the system ranks blocks based on their relevance to common queries, such as those involving account balances or product details. This ranking enables intelligent prefetching, where the system proactively loads high-priority blocks into memory before a query is executed, reducing retrieval times. The layer also supports new customer integration by analyzing their initial query behaviors to establish unique access patterns, ensuring that the system remains effective for both established and emerging user groups.

The third layer addresses join selectivity estimation and learned index structures, employing a genetic algorithm to optimize query performance. The genetic algorithm generates a diverse population of candidate solutions, each representing a potential join selectivity estimate—the proportion of records expected to match the join condition. These candidates are evaluated based on historical query outcomes, with the algorithm applying selection and crossover operations to evolve more accurate estimates. For instance, it might predict that 70% of customer credit profiles match loan application records, indicating a high-probability join strategy. This iterative evolution refines the estimates, ensuring that the system anticipates the output of join operations with precision.

Join selectivity calculation follows, where the system uses the genetic algorithm's estimates to determine the expected number of records resulting from a join. This calculation informs query planning, allowing the system to allocate appropriate computational resources, such as memory and processing power, without over- or underestimating needs. For example, if a join between customer and transaction tables is expected to produce 50,000 records during peak hours, the system prepares accordingly, avoiding bottlenecks or resource waste. Accurate selectivity estimates minimize unnecessary table scans, reducing query execution time and enhancing overall system efficiency.

Learned index structures are a pivotal component of the third layer, replacing traditional static indexes with dynamic, machine-learning-driven alternatives. The system designs these indexes based on patterns identified by quantum annealing and swarm AI, tailoring them to specific query types. For example, if customers frequently query primary account and product information, the system creates an index that directly links these data points, bypassing less relevant secondary account data. The index design prioritizes minimal storage requirements while maximizing retrieval speed, achieved through compact data structures that encode access patterns efficiently.

Index tuning ensures that these learned structures remain optimized over time. The system continuously monitors query performance and user behavior, adjusting the indexes to reflect changes, such as increased query volumes during promotional periods or shifts in customer preferences. For instance, if a surge in loan inquiries occurs, the system might refine the index to prioritize loan-related data blocks, ensuring rapid responses. This adaptive tuning leverages insights from all layers, integrating data distribution patterns, access predictions, and selectivity estimates to maintain peak efficiency.

The invention's integrative framework unifies the outputs of quantum annealing, swarm AI, and genetic algorithms into a cohesive solution. Quantum annealing provides a detailed map of data distribution, swarm AI identifies high-priority access paths, and genetic algorithms optimize join strategies and indexing. This synthesis enables the system to handle complex databases with millions of records and intricate relationships, delivering fast, accurate query responses. The framework's modularity allows each layer to operate independently while contributing to a shared goal, enhancing the system's flexibility and robustness.

Dynamic join creation is another distinctive feature, where the system identifies new opportunities to combine data blocks based on historical and real-time query patterns. For example, if queries consistently require primary account and product data, the system might create a direct join that skips intermediate tables, reducing the number of scans and accelerating retrieval. This dynamic approach adapts to repetitive or predictable queries, ensuring that the system optimizes performance for common use cases while remaining flexible for unique or ad-hoc requests.

Learned Bloom filters enhance the accuracy of join candidate selection, using machine learning to minimize false positives when identifying matching records. These filters, trained on historical join outcomes, ensure that only relevant records are retrieved, reducing computational overhead. For instance, in a join between customer and order tables, the filter might exclude non-matching records with high confidence, streamlining the process. This precision improves resource efficiency, particularly in large-scale systems where unnecessary processing can degrade performance.

Predictive page loading further optimizes data retrieval by anticipating which data pages in external memory will be needed next. Machine learning models analyze access patterns to preload these pages, reducing input/output wait times. For example, if a query type frequently accesses transaction logs, the system preloads the corresponding pages, ensuring immediate availability. This feature is particularly valuable during high-traffic periods, when rapid data access is essential to maintaining system responsiveness.

Join order optimization leverages learned models to determine the most efficient sequence for executing multiple join operations. By prioritizing joins that produce smaller intermediate result sets, the system reduces computational effort and speeds up query processing. For instance, joining a smaller table first might significantly decrease the number of records processed in subsequent joins, leading to faster execution. This optimization is critical for complex queries involving multiple tables, where the order of operations can dramatically impact performance.

The invention's applicability extends to diverse domains, including e-commerce, where it optimizes queries related to product inventories, customer accounts, and purchase histories. In such environments, the system ensures rapid responses to user requests, such as order status checks or product detail lookups, enhancing user satisfaction. Its ability to handle varied data types and query patterns makes it a versatile solution for any industry relying on large-scale relational databases.

The system's emphasis on resource efficiency is evident in its compact learned index structures, accurate selectivity estimates, and predictive loading strategies. These features minimize storage and processing requirements, enabling scalability for databases with growing data volumes. By optimizing both computational and memory resources, the system ensures that performance remains robust even under heavy query loads, addressing the needs of high-performance, data-intensive applications.

The invention's real-time adaptability distinguishes it from conventional database management systems. By continuously learning from historical data, predicting future access patterns, and dynamically adjusting join strategies and indexes, the system responds to evolving user needs and database conditions. This adaptability, combined with its comprehensive integration of advanced AI technologies, positions the invention as a groundbreaking solution for optimizing join operations, delivering significant performance improvements in complex database environments.

In light of the preceding discussion, the following identifies various sample embodiments of the present disclosure to establish a basic understanding of its various components. This summary is not exhaustive, nor does it limit the illustrative embodiments of the inventions described in this document. It is not intended to identify the most essential features or steps of the disclosure, nor to define its scope. Instead, as would be recognized by someone skilled in the field, it seeks to introduce certain concepts of the disclosure in a clear and simple way, acting as a preface to the more detailed explanation that follows. Throughout this application, the specification offers thorough written descriptions of the inventions, including exemplary, non-exhaustive, and non-limiting methods and processes for making and using the inventions. These descriptions are expressed in complete, clear, concise, and precise terms, allowing those skilled in the art to implement and utilize various embodiments of the inventions without undue experimentation.

In some arrangements, a method for optimizing database join operations in a relational database on a database server includes collecting historical data, which comprises customer profiles, transaction histories, product details, and query logs from the relational database, by a data preparation module executing on the database server. The method also involves normalizing the historical data to standardize formats, scales, and units across datasets in real-time by the data preparation module. Additionally, the method includes transforming the normalized historical data into a structured format, which consists of a relational graph and a data matrix for quantum processing, by the data preparation module.

The method further entails processing the structured format to identify an optimal join strategy by iteratively sampling a solution space in a quantum superposition state and converging on a minimum energy state by a quantum annealing module executing on a quantum computing processor communicatively coupled to the database server. The method also comprises analyzing the optimal join strategy to generate a correlation matrix identifying relationships between columns and tables in the relational database by a pattern identification module executing on the database server. Moreover, the method includes initializing a population of artificial ants, wherein each artificial ant represents a data block in the relational database, by a swarm artificial intelligence module executing on the database server.

The method also involves navigating the population of artificial ants through data blocks by following pheromone trails to identify high-relevance data blocks in real-time by the swarm artificial intelligence module. The method further includes converging the population of artificial ants on the high-relevance data blocks to reinforce the pheromone trails based on query frequency by the swarm artificial intelligence module. Additionally, the method comprises ranking the high-relevance data blocks to select prefetch blocks for data retrieval during join operations by the swarm artificial intelligence module.

The method also entails estimating a join selectivity by generating and evolving a population of candidate solutions to predict a proportion of records matching a join condition in the relational database by a genetic algorithm module executing on the database server. The method further includes calculating an expected number of records resulting from a join operation based on the join selectivity to allocate server resources by the genetic algorithm module. Moreover, the method includes creating a learned index structure based on the correlation matrix and the prefetch blocks to facilitate real-time data retrieval by an index creation module executing on the database server. The method also comprises tuning the learned index structure based on real-time query performance metrics to maintain retrieval efficiency during join operations by an index tuning module executing on the database server.

In some arrangements, the method may also include normalizing the historical data by handling missing values and removing duplicates from the customer profiles, transaction histories, product details, and query logs in real-time on the database server by the data preparation module.

In some arrangements, the method may also include transforming the normalized historical data by generating the relational graph to represent relationships between the customer profiles, the transaction histories, and the product details for processing by the quantum computing processor by the data preparation module.

In some arrangements, the method may also include processing the structured format by initializing parameters, which consist of a quantum thermal and a solution space boundary, for the quantum annealing module to optimize join strategy identification by the quantum annealing module.

In some arrangements, the method may also include analyzing the optimal join strategy by updating the relational graph with the correlation matrix to identify frequent access patterns specific to join operations in the relational database by the pattern identification module.

In some arrangements, the method may also include initializing the population of artificial ants by assigning each artificial ant a random data block and an initial pheromone trail based on historical query patterns in the relational database by the swarm artificial intelligence module.

In some arrangements, the method may also include navigating the population of artificial ants by calculating transition probabilities based on the pheromone trails to select a next data block for each artificial ant in real-time during join operations by the swarm artificial intelligence module.

In some arrangements, the method may also include converging the population of artificial ants by incrementing a convergence map for each visited data block and reinforcing the pheromone trails for data blocks exceeding a convergence threshold determined by query frequency by the swarm artificial intelligence module.

In some arrangements, the method may also include estimating the join selectivity by evaluating a fitness of each candidate solution by comparing predicted record counts to historical join outcomes stored in the relational database by the genetic algorithm module.

In some arrangements, the method may also include training a learned Bloom filter using historical join data to reduce false positives in join candidate selection during join operations by a Bloom filter module executing on the database server. The method further includes applying the learned Bloom filter to filter records in real-time during the join operation on the database server by the Bloom filter module.

In some arrangements, a method for optimizing database join operations in a relational database on a database server includes collecting historical data, which comprises customer profiles, transaction histories, product details, and query logs from the relational database, by a data preparation module executing on the database server. The method also involves normalizing the historical data to standardize formats, scales, and units across datasets in real-time, wherein normalizing includes handling missing values and removing duplicates, by the data preparation module. Additionally, the method includes transforming the normalized historical data into a structured format, which consists of a relational graph representing relationships between the customer profiles, the transaction histories, and the product details, and a data matrix for quantum processing, by the data preparation module.

The method further entails processing the structured format to identify an optimal join strategy by iteratively sampling a solution space in a quantum superposition state with initialized parameters, which include a quantum thermal and a solution space boundary, and converging on a minimum energy state by a quantum annealing module executing on a quantum computing processor communicatively coupled to the database server. The method also comprises analyzing the optimal join strategy to generate a correlation matrix identifying relationships between columns and tables in the relational database, and updating the relational graph with the correlation matrix to identify frequent access patterns specific to join operations, by a pattern identification module executing on the database server. Moreover, the method includes initializing a population of artificial ants, wherein each artificial ant represents a data block in the relational database and is assigned a random data block and an initial pheromone trail based on historical query patterns, by a swarm artificial intelligence module executing on the database server.

The method also involves navigating the population of artificial ants through data blocks by calculating transition probabilities based on pheromone trails to select a next data block for each artificial ant in real-time by the swarm artificial intelligence module. The method further includes converging the population of artificial ants on high-relevance data blocks by incrementing a convergence map for each visited data block and reinforcing the pheromone trails for data blocks exceeding a convergence threshold determined by query frequency by the swarm artificial intelligence module. Additionally, the method comprises ranking the high-relevance data blocks to select prefetch blocks for data retrieval during join operations by the swarm artificial intelligence module.

The method also entails estimating a join selectivity by generating and evolving a population of candidate solutions, evaluating a fitness of each candidate solution by comparing predicted record counts to historical join outcomes to predict a proportion of records matching a join condition, by a genetic algorithm module executing on the database server. The method further includes calculating an expected number of records resulting from a join operation based on the join selectivity to allocate server resources by the genetic algorithm module. Moreover, the method includes creating a learned index structure based on the correlation matrix and the prefetch blocks to facilitate real-time data retrieval by an index creation module executing on the database server.

The method also comprises tuning the learned index structure based on real-time query performance metrics to maintain retrieval efficiency during join operations by an index tuning module executing on the database server. The method further includes training a learned Bloom filter using historical join data to reduce false positives in join candidate selection by a Bloom filter module executing on the database server. Additionally, the method includes applying the learned Bloom filter to filter records in real-time during the join operation by the Bloom filter module.

The method also involves predicting data pages to preload into a cache memory of the database server based on historical access patterns to reduce input/output wait times during join operations by a page prediction module executing on the database server. The method further includes optimizing a sequence of join operations by estimating result sizes based on the join selectivity to minimize intermediate record counts by a join order module executing on the database server. Moreover, the method includes monitoring real-time system performance metrics, including query latency and resource utilization, during join operations by a monitoring module executing on the database server. The method also comprises adapting the population of artificial ants by adjusting a number of the artificial ants based on the real-time system performance metrics to optimize computational efficiency by an adaptation module executing on the database server.

In some arrangements, a system for optimizing database join operations in a relational database includes a database server configured to host the relational database. The system also includes a quantum computing processor communicatively coupled to the database server. Additionally, the system comprises a data preparation module executing on the database server configured to collect historical data, which includes customer profiles, transaction histories, product details, and query logs from the relational database, normalize the historical data to standardize formats, scales, and units across datasets in real-time, and transform the normalized historical data into a structured format, which consists of a relational graph and a data matrix for quantum processing.

The system further includes a quantum annealing module executing on the quantum computing processor configured to process the structured format to identify an optimal join strategy by iteratively sampling a solution space in a quantum superposition state and converging on a minimum energy state. The system also comprises a pattern identification module executing on the database server configured to analyze the optimal join strategy to generate a correlation matrix identifying relationships between columns and tables in the relational database. Moreover, the system includes a swarm artificial intelligence module executing on the database server configured to initialize a population of artificial ants, wherein each artificial ant represents a data block in the relational database, navigate the population of artificial ants through data blocks by following pheromone trails to identify high-relevance data blocks in real-time, converge the population of artificial ants on the high-relevance data blocks to reinforce the pheromone trails based on query frequency, and rank the high-relevance data blocks to select prefetch blocks for data retrieval during join operations.

The system also includes a genetic algorithm module executing on the database server configured to estimate a join selectivity by generating and evolving a population of candidate solutions to predict a proportion of records matching a join condition, and calculate an expected number of records resulting from a join operation based on the join selectivity to allocate server resources. The system further comprises an index creation module executing on the database server configured to create a learned index structure based on the correlation matrix and the prefetch blocks to facilitate real-time data retrieval. Additionally, the system includes an index tuning module executing on the database server configured to tune the learned index structure based on real-time query performance metrics to maintain retrieval efficiency during join operations.

The system also comprises a Bloom filter module executing on the database server configured to train a learned Bloom filter using historical join data and apply the learned Bloom filter to filter records in real-time during the join operation. The system further includes a page prediction module executing on the database server configured to predict data pages to preload into a cache memory of the database server based on historical access patterns. Moreover, the system includes a join order module executing on the database server configured to optimize a sequence of join operations by estimating result sizes based on the join selectivity. The system also comprises a monitoring module executing on the database server configured to monitor real-time system performance metrics during join operations. The system further includes an adaptation module executing on the database server configured to adapt the population of artificial ants based on the real-time system performance metrics.

In some arrangements, the system may also include the data preparation module being further configured to handle missing values and remove duplicates during normalization of the historical data in real-time on the database server.

In some arrangements, the system may also include the data preparation module being further configured to generate the relational graph to represent relationships between the customer profiles, the transaction histories, and the product details for processing by the quantum computing processor.

In some arrangements, the system may also include the quantum annealing module being further configured to initialize parameters, which include a quantum thermal and a solution space boundary, for processing the structured format to optimize join strategy identification.

In some arrangements, the system may also include the pattern identification module being further configured to update the relational graph with the correlation matrix to identify frequent access patterns specific to join operations in the relational database.

In some arrangements, the system may also include the swarm artificial intelligence module being further configured to assign each artificial ant a random data block and an initial pheromone trail based on historical query patterns in the relational database.

In some arrangements, the system may also include the swarm artificial intelligence module being further configured to calculate transition probabilities based on the pheromone trails to select a next data block for each artificial ant in real-time during join operations.

In some arrangements, the system may also include the swarm artificial intelligence module being further configured to increment a convergence map for each visited data block and reinforce the pheromone trails for data blocks exceeding a convergence threshold determined by query frequency during join operations.

In some arrangements, the system may also include a real-time monitoring module executing on the database server configured to collect real-time query performance metrics, which include query execution time, resource utilization, and cache hit rates, from the relational database during execution of the join operation. The system further includes a dynamic adaptation module executing on the database server configured to adjust the population of artificial ants by increasing or decreasing a number of the artificial ants based on a query volume detected by the real-time monitoring module to maintain computational efficiency. Additionally, the system comprises a pattern update module executing on the database server configured to update the correlation matrix in real-time by incorporating new access patterns detected by the real-time monitoring module during execution of the join operation.

The system also includes a selectivity refinement module executing on the database server configured to refine the join selectivity estimate by incrementally updating the population of candidate solutions with new historical join outcomes collected by the real-time monitoring module. The system further comprises an index optimization module executing on the database server configured to dynamically modify the learned index structure by adding new index entries for frequently accessed data blocks identified by the pattern update module and removing outdated index entries based on the real-time query performance metrics. Moreover, the system includes a Bloom filter update module executing on the database server configured to retrain the learned Bloom filter periodically using the new historical join outcomes to maintain accuracy in join candidate selection during join operations.

The system also comprises a page prediction update module executing on the database server configured to retrain a page prediction model using the new access patterns to improve accuracy of data page preloading into the cache memory of the database server. The system further includes a join order refinement module executing on the database server configured to re-evaluate the sequence of join operations by incorporating updated result size estimates from the selectivity refinement module to further minimize intermediate record counts during execution of the join operation. Additionally, the system includes a distributed processing module executing on the database server configured to segment the relational database across multiple nodes of a distributed database system and coordinate data block access for the population of artificial ants across the multiple nodes. The system also comprises a fault tolerance module executing on the database server configured to detect failures in the quantum computing processor or the database server and reroute processing tasks to alternative hardware resources to ensure continuous execution of the join operation.

The following description and claims, in conjunction with the drawings—all integral parts of this specification—will clarify various features and characteristics of the current technology. Like reference numerals in the figures correspond to similar parts, enhancing understanding of the technology's methods of operation and the functions of related structural elements, as well as the synergies and economies of their combinations. Some of the processes or procedures described here may be implemented, in whole or in part, as computer-executable instructions recorded on non-transitory computer-readable media, configured as computer modules, or in other computer constructs. These steps and functionalities may be executed on a single device or distributed across multiple devices interconnected with one another. However, it is important to acknowledge that the drawings primarily serve for descriptive and illustrative purposes and are not intended to delineate the limits of the invention. Unless contextually evident, the singular forms of "a," "an," "the," and "invention" used throughout the specification and claims should be interpreted to include their plural counterparts.

DETAILED DESCRIPTION

Figure 1:
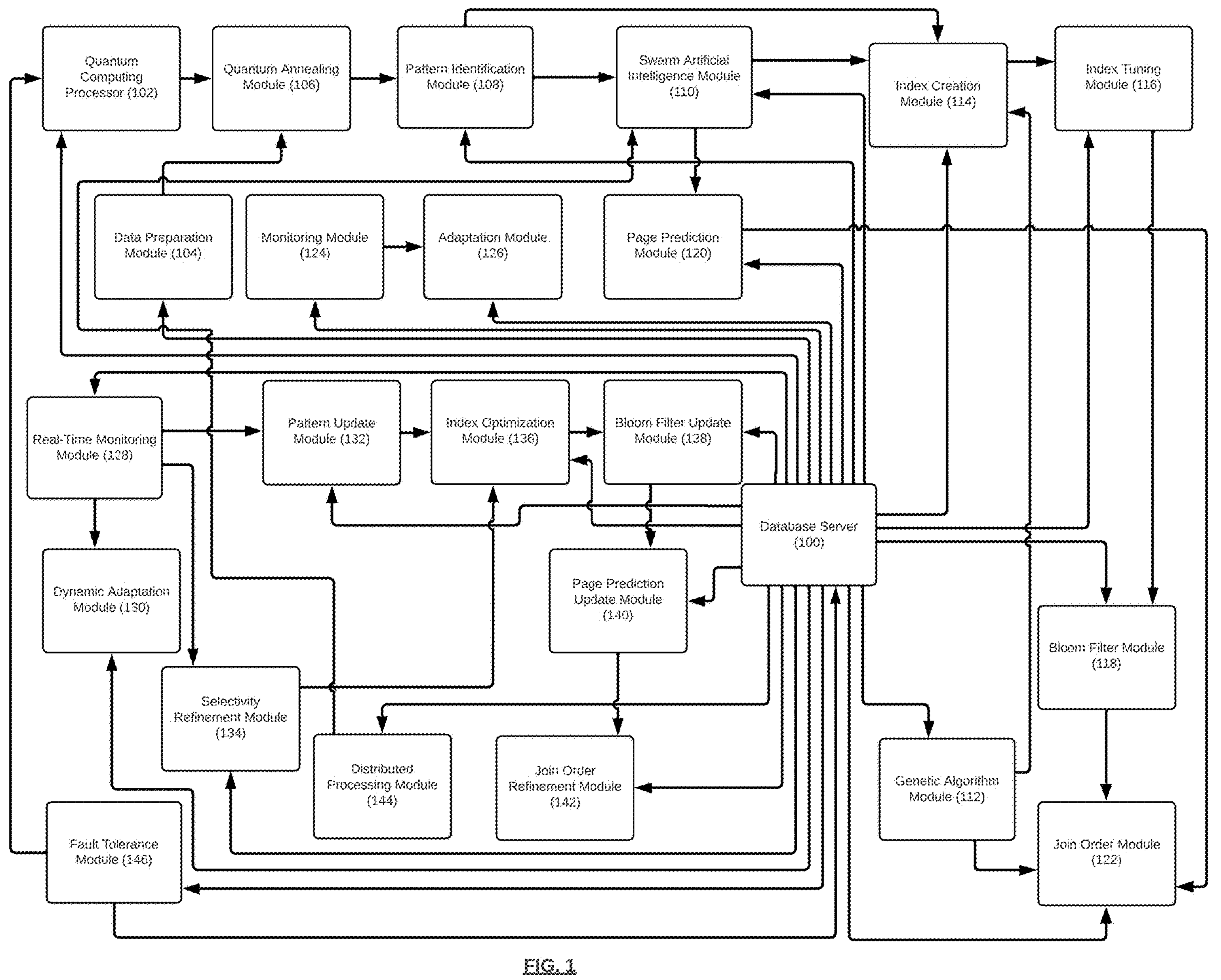
FIG. 1 is an exemplary system architecture diagram in accordance with one or more embodiments disclosed herein that illustrates the interconnected components and data flow for optimizing database join operations in a relational database. The diagram depicts the integration of a database server, quantum computing processor, and specialized modules to enhance query performance through advanced computational techniques.

The inventions provide sophisticated systems and methods for optimizing database join operations in large-scale relational databases, leveraging a novel integration of quantum annealing, swarm intelligence, and genetic algorithms to enhance data retrieval efficiency. This approach targets environments with vast, interconnected datasets, such as those in banking and e-commerce, where rapid query responses are essential. The system is structured into three distinct layers, each addressing specific aspects of data management: learning data distribution patterns, predicting access behaviors, and estimating join selectivity while creating optimized index structures. By combining these advanced computational techniques, the invention achieves significant improvements in query response times, resource utilization, and scalability, offering a transformative solution for managing complex database operations.

The first layer focuses on data distribution learning through quantum annealing, beginning with meticulous data preparation. Historical data, encompassing customer profiles, account types, transaction histories, product usage, and query logs, is collected from diverse sources, such as online platforms and physical branch records. This data undergoes normalization to ensure consistency across datasets, addressing variations in formats, scales, or units. For example, transaction amounts in different currencies are standardized, and account types are categorized uniformly. The normalized data is transformed into a structured format, such as matrices or relational graphs, to facilitate efficient processing by quantum annealing algorithms.

Quantum annealing, the core of the first layer, utilizes principles of quantum mechanics to explore the solution space and identify optimal join strategies. The algorithm initializes with parameters like thermal and solution boundaries, defining the scope of possible data configurations. It iteratively samples combinations of data blocks and table relationships to determine the most efficient ways to join related data points, such as customer profiles with transaction records. This process, akin to cooling in physical annealing, refines solutions to converge on a global minimum, representing the most effective data distribution strategy. For instance, in a banking system, it could optimize joins between customer accounts and loan transactions, minimizing retrieval time while ensuring accuracy.

Pattern identification follows quantum annealing, where the system analyzes the algorithm's outputs to uncover correlations between columns and tables. This step generates a detailed relationship graph or matrix that maps connections, such as frequent associations between customers with personal loans and their savings accounts. These correlations reveal how data is distributed across the database, identifying which tables or blocks are most likely to contain relevant records for specific queries. The insights are critical for guiding subsequent layers, enabling targeted data retrieval by highlighting high-frequency access patterns, such as customers querying loan statuses alongside product details.

The second layer employs swarm intelligence, specifically an ant colony optimization algorithm, to predict data access patterns dynamically. This layer initializes a population of artificial ants, each representing a potential data block, such as a segment of customer records or transaction logs. The ants navigate the data space, guided by pheromone trails established by previous explorations, which indicate areas of high relevance based on historical query patterns. For example, in an e-commerce platform, ants might prioritize blocks containing popular product categories, reinforcing trails for frequently accessed data. The navigation process balances exploration of new paths with targeting of known high-value areas, ensuring adaptability to evolving user behaviors.

As ants move through the data space, they converge on specific regions, incrementing a convergence map for each visited block and reinforcing pheromone trails for those exceeding a query frequency threshold. This convergence process distills complex access patterns into actionable insights, identifying hotspots where relevant data blocks reside. For instance, in a banking system, ants could cluster on blocks containing recent transaction data for high-net-worth clients, marking them for prefetching. The swarm intelligence layer ranks these blocks to select prefetch candidates, proactively loading them into memory to reduce retrieval times, thus optimizing query performance for frequent access patterns.

The third layer addresses join selectivity estimation and learned index structures, utilizing a genetic algorithm to enhance query performance. The genetic algorithm generates a diverse population of candidate solutions, each representing a potential join selectivity estimate, predicting the proportion of records expected to match a join condition. Through iterative processes of selection, crossover, and mutation, the algorithm evolves these solutions to produce accurate estimates. For example, in an order processing system, it might predict a 70% match rate between customer and order records, guiding resource allocation. The selectivity estimates calculate the expected number of records, ensuring efficient query planning by allocating appropriate computational resources.

Learned index structures are dynamically designed based on patterns from quantum annealing and swarm intelligence, replacing static traditional indexes with machine-learning-driven alternatives. These indexes are tailored to specific query types, minimizing storage requirements while maximizing retrieval speed. For instance, in an e-commerce database, an index could directly link customer IDs to order records, bypassing less relevant data. The index creation process integrates correlation matrices and prefetch blocks, ensuring alignment with frequent queries. Index tuning continuously adjusts these structures based on real-time performance metrics, such as query latency, to maintain efficiency, adapting to shifts in query patterns or data volumes.

The invention incorporates learned Bloom filters to enhance join candidate selection, training filters on historical join data to minimize false positives. These filters ensure only relevant records are retrieved, reducing computational overhead. For example, in a banking system, a filter could exclude non-matching records for account-transaction joins, streamlining processing. The training process leverages machine learning libraries like scikit-learn, with filters stored in high-performance databases for rapid access. Periodic retraining updates filters with new join outcomes, maintaining accuracy as data evolves.

Predictive page loading anticipates data page needs, using machine learning models to preload pages into cache memory based on historical access patterns. For instance, in a financial system, a TensorFlow LSTM model could predict transaction page accesses, reducing input/output wait times. The models are trained on access logs, run on GPU clusters for speed, and orchestrated by frameworks like Kubeflow. Retraining ensures predictions align with current patterns, enhancing performance during peak query periods. This feature minimizes disk I/O, critical for maintaining responsiveness in high-traffic environments.

Join order optimization determines the most efficient sequence for executing multiple join operations, prioritizing those producing smaller intermediate result sets. For example, in a retail database, joining a small customer table before a large order table could reduce computational load. The optimization process uses graph-based algorithms, implemented in C++ with Boost libraries, and leverages selectivity estimates to compute result sizes. The optimized sequence is cached in Redis, ensuring rapid access for query execution, and refined periodically to adapt to new data patterns.

The system's integrative framework unifies quantum annealing, swarm intelligence, and genetic algorithms into a cohesive solution, synthesizing their outputs to optimize join operations holistically. Each component contributes unique insights: quantum annealing maps data distribution, swarm intelligence predicts access patterns, and genetic algorithms refine selectivity and indexing. This modularity allows independent operation while fostering synergy, enabling the system to handle complex databases with millions of records and intricate relationships. The framework's flexibility supports diverse applications, from banking to e-commerce, ensuring scalability and adaptability.

Real-time monitoring and adaptation enhance system performance, with modules collecting metrics like query latency, resource utilization, and cache hit rates. For example, in a retail system, Prometheus could monitor 1 million metrics, visualized in Grafana, guiding dynamic adjustments. The adaptation module scales ant populations based on query volume, using Node.js scripts on Kubernetes to balance computational efficiency. Real-time updates to correlation matrices, selectivity estimates, and index structures ensure the system remains responsive to evolving workloads, with updates processed by Apache Spark and stored in Cassandra.

Distributed processing segments the database across multiple nodes, coordinating data access for swarm intelligence operations. In a global e-commerce system, Apache Hadoop with HDFS could manage 10 petabytes of data, with ZooKeeper ensuring ant navigation consistency. Fault tolerance mechanisms detect and reroute failures in the quantum processor or database server, using Kubernetes with Helm charts to maintain continuous operation. For instance, a Python-based failover script could redirect tasks to backup nodes, logged in Prometheus, ensuring high availability in mission-critical applications.

The invention's comprehensive design, combining quantum, swarm, and genetic algorithms with real-time adaptability and fault tolerance, positions it as a groundbreaking solution for database management. Its ability to learn from historical data, predict future access patterns, and dynamically optimize join operations addresses the complexities of modern databases. The system delivers exceptional performance improvements, enabling rapid, resource-efficient query processing in data-intensive environments, transforming how large-scale relational databases are managed.

Various example embodiments in the disclosure are designed to fulfill the objectives mentioned in the preceding discussion, as illustrated in the accompanying figures showcasing systems and methods for optimizing database join operations. These embodiments demonstrate different implementation approaches, allowing adjustments to structure and operation, with connections among components understood flexibly as direct or indirect, wired or wireless, unless specified otherwise, ensuring adaptability to diverse computational environments while maintaining the invention's core functionality.

Artificial intelligence techniques integral to the invention include quantum annealing, a form of quantum computing that optimizes complex problems by finding the global minimum of an energy landscape. In the invention, quantum annealing learns data distribution patterns by encoding relational graphs as quadratic unconstrained binary optimization problems, processed on hardware like D-Wave's Advantage system. For example, it optimizes joins between customer and transaction tables in a banking database, using Qiskit to define annealing schedules and sample solutions. This approach leverages quantum superposition to explore vast solution spaces, significantly reducing computation time compared to classical methods, making it ideal for handling large-scale database joins.

Swarm intelligence, specifically ant colony optimization, is another artificial intelligence technique applied to predict data access patterns. This bio-inspired algorithm simulates a population of artificial ants navigating data blocks, guided by pheromone trails that reflect query frequencies. In an e-commerce system, the Swarm AI Module (410) could use ACOJava to prioritize product data blocks, with trails stored in Redis and updated via Apache Flink. The collective behavior of ants, implemented in Scala with Akka for concurrency, identifies high-relevance blocks for prefetching, adapting dynamically to query surges during sales events, ensuring efficient data retrieval.

Genetic algorithms, an evolutionary computation technique, are employed to estimate join selectivity by evolving a population of candidate solutions through selection, crossover, and mutation. In the invention, the Genetic Algorithm Module (412) predicts the proportion of matching records for joins, such as customer-order pairs in a retail database, using DEAP in Python on a GPU cluster. Fitness evaluations compare predicted record counts to historical outcomes in MySQL, with results guiding resource allocation. This approach, orchestrated by Kubernetes, refines selectivity estimates iteratively, enhancing query planning accuracy and optimizing computational efficiency for complex join operations.

Machine learning, particularly supervised learning, supports learned Bloom filters and page prediction models. The Bloom Filter Module (418) trains filters on historical join data to minimize false positives, using scikit-learn for logistic regression models in a banking system, stored in RocksDB. Similarly, the Page Prediction Module (420) uses TensorFlow LSTM models to predict transaction page accesses, trained on access logs in Parquet format and run on NVIDIA A100 GPUs. These models, updated via Kubeflow pipelines, ensure precise join candidate selection and page preloading, reducing computational overhead and input/output wait times, critical for high-performance query processing.

In FIG. 1, a sample system architecture for optimizing database join operations in a relational database is presented, showcasing a comprehensive network of interconnected components designed to enhance query performance through sophisticated computational methods. The central component, the Database Server (100), serves as the primary host for the relational database, managing data storage, query execution, and module coordination. For example, this could be implemented using a high-performance server running PostgreSQL, Oracle Database, or Microsoft SQL Server, equipped with multiple CPU cores, terabytes of RAM, and solid-state drives to handle large-scale datasets such as customer profiles, transaction histories, and product inventories in a banking or e-commerce system. The Database Server (100) maintains persistent storage for millions of records, supports concurrent query processing, and provides a robust environment for executing software modules. It connects to the Quantum Computing Processor (102), a specialized hardware unit dedicated to quantum computations. An example implementation might involve a D-Wave Advantage quantum annealer or IBM Quantum System One, configured with qubits and quantum gates to process complex optimization tasks for join strategies, leveraging quantum superposition to explore vast solution spaces.

The Data Preparation Module (104), residing on the Database Server (100), is responsible for collecting and preprocessing historical data from the relational database. For instance, in an e-commerce platform, this module could gather customer purchase records, product specifications, payment transaction logs, and user query histories, using Python scripts with pandas and NumPy to normalize data by standardizing date formats, converting currency values to a common unit, and removing duplicate entries. It could also employ Apache Spark for distributed data processing to handle petabyte-scale datasets, ensuring consistency across heterogeneous data sources like online and in-store transactions. The Data Preparation Module (104) transforms normalized data into a structured format, generating a relational graph to map entity relationships and a data matrix for numerical computations. The relational graph might use Neo4j to represent connections between customers, orders, and products, while the data matrix could be a sparse matrix in SciPy format for efficient storage. This module feeds its output to the Quantum Annealing Module (106), which operates on the Quantum Computing Processor (102).

The Quantum Annealing Module (106) processes the structured data to identify optimal join strategies for database queries. For example, in a financial institution, it could optimize joins between customer account tables and transaction logs, using a quantum software framework like Qiskit or D-Wave's Ocean SDK to encode relational graphs as quadratic unconstrained binary optimization problems. The module initializes parameters such as quantum annealing schedules and solution space boundaries, then iteratively samples solutions in a quantum superposition state, converging on a minimum energy state that represents the most efficient join path. This could reduce query execution time for complex joins involving millions of records, such as linking loan applications with payment histories. The Quantum Annealing Module (106) connects to the Pattern Identification Module (108) on the Database Server (100), which analyzes the optimal join strategies to uncover data relationships.

The Pattern Identification Module (108) generates a correlation matrix to identify relationships between columns and tables in the relational database. For instance, in a banking system, this module might use R with the corrr package to compute Pearson correlations, revealing frequent associations between loan accounts, savings accounts, and transaction types. It could also employ graph analytics in NetworkX to update the relational graph with weighted edges, highlighting high-frequency access patterns, such as customers querying loan statuses alongside credit card transactions. The module stores these patterns in a metadata repository, such as MongoDB, for use by other components. The Pattern Identification Module (108) interfaces with the Swarm Artificial Intelligence Module (110), also on the Database Server (100), which predicts data access patterns using bio-inspired algorithms.

The Swarm Artificial Intelligence Module (110) initializes a population of artificial ants, each representing a data block in the relational database, such as a partition of customer records or transaction logs. For example, in an online retail system, this module could use a Java-based ant colony optimization library like ACOJava, simulating 10,000 ants navigating data blocks to prioritize frequently queried product categories. Each ant is assigned a random starting block and an initial pheromone trail based on historical query patterns, stored in a Redis cache for fast access. The module navigates ants through blocks by calculating transition probabilities using pheromone levels, implemented with a probabilistic model in Apache Flink for real-time processing. Ants converge on high-relevance blocks, reinforcing pheromone trails based on query frequency, and the module ranks these blocks to select prefetch candidates. The Swarm Artificial Intelligence Module (110) links to the Index Creation Module (114) and the Page Prediction Module (120), both on the Database Server (100).

The Index Creation Module (114) builds learned index structures to facilitate rapid data retrieval. For instance, in an e-commerce database, this module could use C++ with the Learned Index Structures library to create compact indexes mapping customer IDs to product purchase records, reducing lookup time compared to traditional B-trees. It integrates patterns from the Pattern Identification Module (108) and prefetch blocks from the Swarm Artificial Intelligence Module (110), storing indexes in a hybrid storage system combining NVMe SSDs and DRAM for low-latency access. The Page Prediction Module (120) anticipates data page needs to reduce input/output wait times. For example, in a banking database, it could train a TensorFlow LSTM model on access logs to predict transaction page accesses during peak hours, preloading pages into a Memcached cache. This module uses historical patterns to forecast page demands, ensuring efficient memory utilization.

The Genetic Algorithm Module (112), also on the Database Server (100), estimates join selectivity to predict the proportion of records matching a join condition. For instance, in a retail system, this module could use the DEAP library in Python to evolve 500 candidate solutions, each representing a selectivity estimate for customer-order joins, evaluating fitness by comparing predicted record counts to historical outcomes stored in PostgreSQL. It calculates expected record counts to allocate server resources, such as CPU threads and memory, using a resource manager like Kubernetes. The Genetic Algorithm Module (112) connects to the Index Creation Module (114) and the Join Order Module (122), which optimizes join sequences. For example, the Join Order Module (122) could use MySQL's query optimizer with custom cost models to prioritize joins producing smaller intermediate results, such as joining a small customer table before a large order table.

The Index Creation Module (114) feeds into the Index Tuning Module (116), which adjusts indexes based on performance metrics. For instance, in SQL Server, this module could use automated tuning advisors to reconfigure indexes for high-traffic queries, monitoring metrics like query latency via Extended Events. The Index Tuning Module (116) connects to the Bloom Filter Module (118), which trains learned Bloom filters to reduce false positives in join candidate selection. For example, in an order processing system, it could use scikit-learn to train a filter on historical join data, implemented in C for low-latency filtering during customer-order joins. The Bloom Filter Module (118) and Page Prediction Module (120) both link to the Join Order Module (122), ensuring optimized join execution across the system.

The Monitoring Module (124) on the Database Server (100) tracks system performance metrics, such as query execution time and resource utilization. For instance, in a retail database, it could use Prometheus with custom exporters to collect metrics, storing them in a time-series database like InfluxDB. It connects to the Adaptation Module (126), which adjusts parameters like ant population size in the swarm module. For example, a Node.js script could scale the ant count from 5,000 to 15,000 based on query volume detected by Prometheus, optimizing computational efficiency. The Real-Time Monitoring Module (128) collects detailed metrics, such as cache hit rates, using Grafana dashboards with SQL queries for visualization, and interfaces with the Dynamic Adaptation Module (130), Pattern Update Module (132), and Selectivity Refinement Module (134).

The Dynamic Adaptation Module (130) adjusts system configurations in real-time, such as using Java with Spring Boot to modify ant populations based on query surges during sales events. The Pattern Update Module (132) updates correlation matrices with new access patterns, potentially using Apache Spark's MLlib for distributed matrix computations, storing updates in Cassandra for scalability. The Selectivity Refinement Module (134) refines join predictions, employing incremental learning in Python with River to update genetic algorithm solutions with new join outcomes. These modules connect to the Index Optimization Module (136), which dynamically modifies indexes, using automated scripts in MongoDB to add entries for new high-traffic blocks and prune outdated ones based on metrics from the Real-Time Monitoring Module (128).

The Index Optimization Module (136) links to the Bloom Filter Update Module (138), which retrains filters using new join data. For example, it could use PyTorch to update a neural network-based Bloom filter, optimizing for minimal false positives in order joins, with retraining triggered by a cron job every 24 hours. The Bloom Filter Update Module (138) connects to the Page Prediction Update Module (140), which retrains prediction models for page preloading, using Keras with GPU acceleration to analyze access patterns from the Pattern Update Module (132). This module feeds into the Join Order Refinement Module (142), which re-evaluates join sequences, leveraging PostgreSQL's GEQO planner with updated selectivity estimates to minimize intermediate record counts.

The Distributed Processing Module (144) on the Database Server (100) manages data across multiple nodes in a distributed database system, such as using Apache Hadoop with HDFS to segment customer and transaction data, coordinating ant navigation across nodes via Apache ZooKeeper. It connects to the Swarm Artificial Intelligence Module (110) to ensure consistent access pattern prediction. The Fault Tolerance Module (146) ensures system reliability by detecting and mitigating failures in the Quantum Computing Processor (102) or Database Server (100). For example, it could use Kubernetes with Helm charts to reroute quantum tasks to a backup processor or reallocate database workloads to standby nodes, maintaining continuous join operation execution. The Fault Tolerance Module (146) connects to both the Quantum Computing Processor (102) and Database Server (100), forming a resilient architecture.

Thus, the example architecture integrates a diverse array of components, from hardware like quantum processors to software modules leveraging machine learning and distributed systems, to optimize database join operations. The interconnected design ensures efficient data flow and real-time adaptability, enhancing performance in data-intensive applications such as banking, e-commerce, or large-scale analytics platforms.

Figure 2:
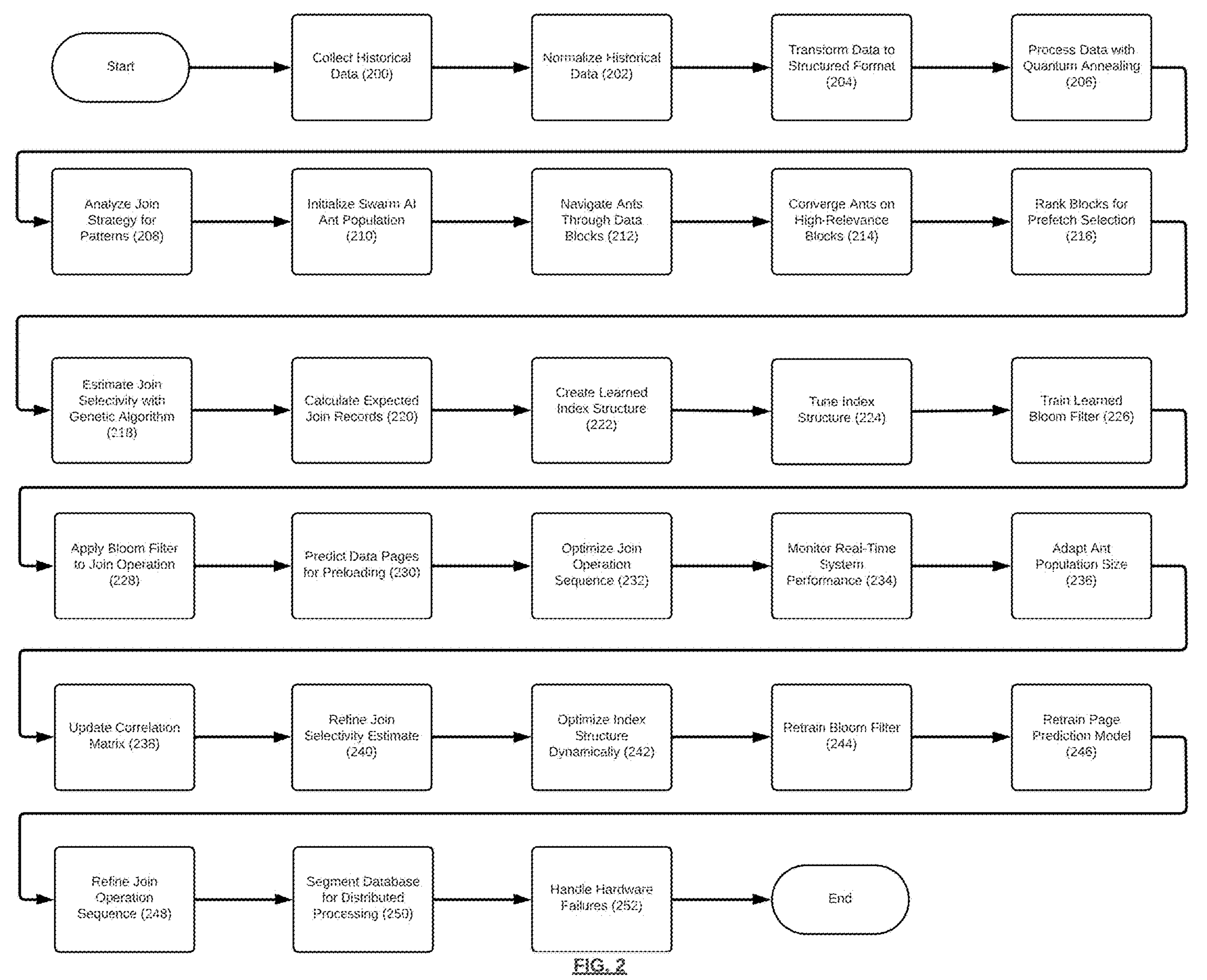
FIG. 2 is an exemplary flow diagram in accordance with one or more embodiments disclosed herein that illustrates the sequential process for optimizing database join operations in a relational database through an integrated framework of quantum annealing, swarm intelligence, and genetic algorithms. The diagram delineates each step, from initial data collection to fault tolerance mechanisms, showcasing a comprehensive workflow to enhance query performance in data-intensive environments.
Figure 3A:
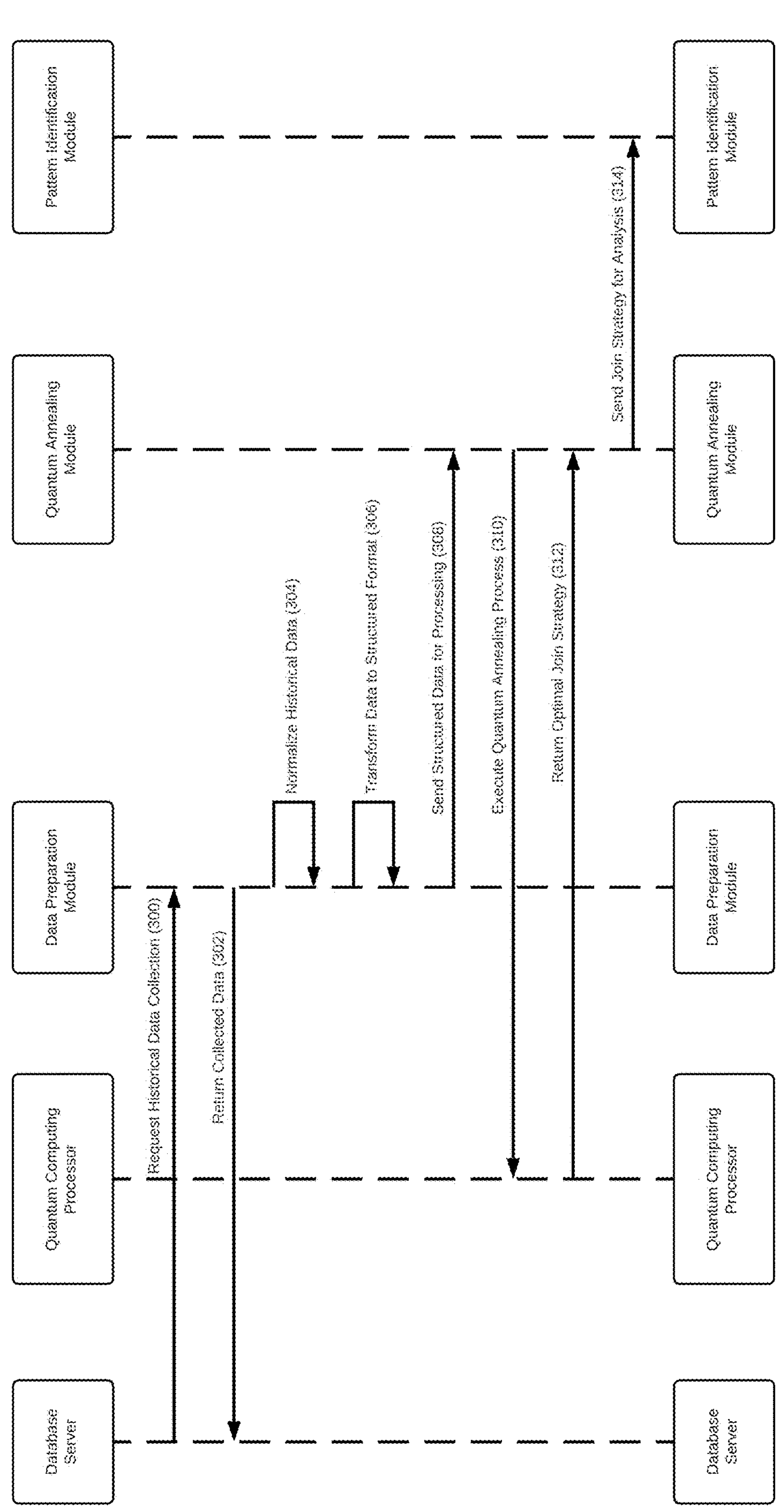
FIGS. 3A-D collectively constitute an exemplary sequence diagram in accordance with one or more embodiments disclosed herein that illustrates the interactions among components for optimizing database join operations in a relational database. The diagrams detail the sequential data flow and processing across a database server, quantum computing processor, and specialized modules to enhance query performance.
Figure 3B:
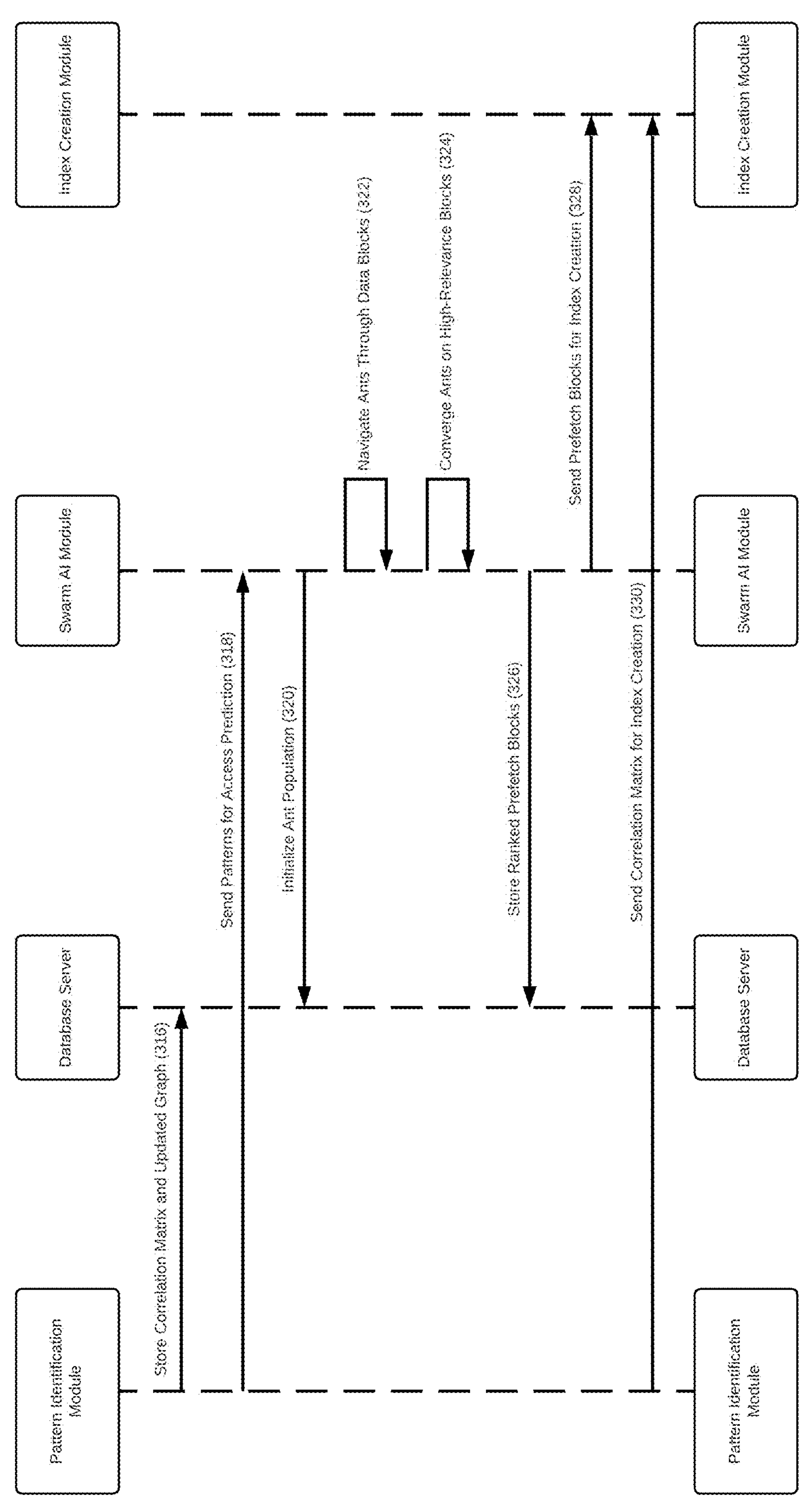
Figure 3C:
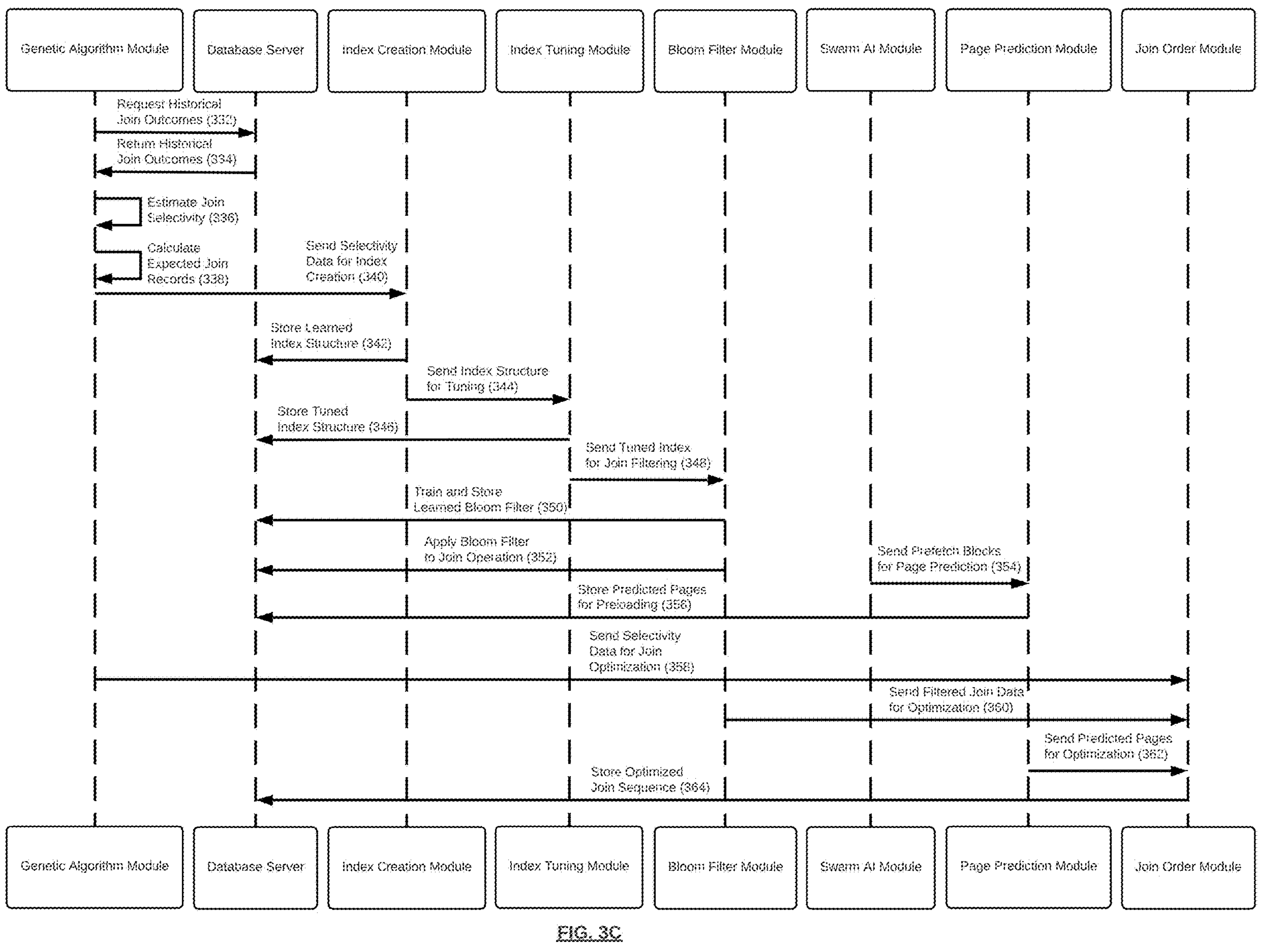
Figure 3D:
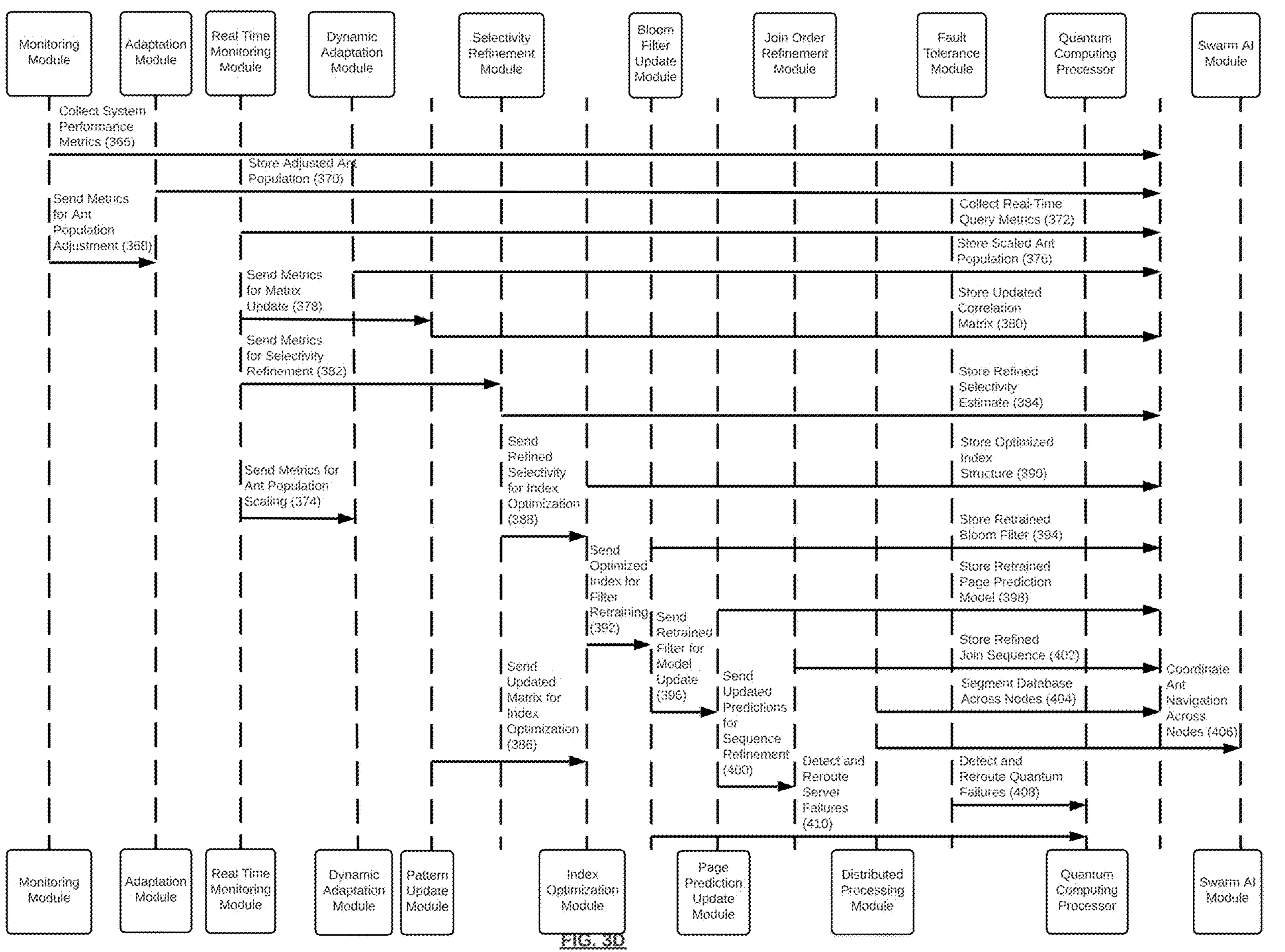

In FIG. 2, a sample flow diagram presents an exemplary sequence of steps for optimizing database join operations in a relational database, illustrating a robust process that integrates advanced computational techniques to achieve high-performance query processing across large-scale datasets. The process commences with the collection of historical data, where a data preparation module gathers customer profiles, transaction histories, product details, and query logs directly from the relational database (200). For example, in a banking system, this step could involve executing complex SQL queries on a PostgreSQL database hosted on a high-performance server with 128 CPU cores and 2 terabytes of RAM, extracting millions of records encompassing customer demographic information, loan and savings account transactions, insurance product specifications, and historical query logs stored in a dedicated schema. The module might employ Apache Kafka to stream data in real-time from disparate sources, such as online banking platforms, mobile applications, and physical branch systems, ensuring comprehensive data capture across heterogeneous environments. Additionally, a data ingestion pipeline built with Apache NiFi could validate and route incoming records, logging metadata in Elasticsearch for traceability. This step establishes a foundational dataset, providing the raw material for subsequent analysis and optimization, critical for handling voluminous and interconnected data typical of financial institutions.

The collected historical data undergoes normalization to standardize formats, scales, and units across datasets in real-time, ensuring consistency for downstream processing (202). This involves handling missing values, removing duplicate entries, and converting data into a uniform structure, such as standardizing date fields to ISO 8601 format, normalizing currency values to USD, and aligning categorical variables like account types to a predefined taxonomy. For instance, in an e-commerce platform, a Python-based data processing pipeline using pandas and NumPy could transform product prices from multiple currencies, impute missing customer demographic data using median substitution, and deduplicate transaction records by comparing unique identifiers. To handle petabyte-scale datasets, Apache Spark could distribute normalization tasks across a cluster of 100 nodes, leveraging in-memory processing for speed. Data quality checks, implemented with Great Expectations, could validate normalized outputs, logging anomalies in a Splunk dashboard for monitoring. This normalization step ensures data integrity, eliminating discrepancies that could skew computational results and enabling accurate pattern identification in subsequent steps.

The normalized data is transformed into a structured format, comprising a relational graph and a data matrix, tailored for quantum processing (204). The relational graph captures entity relationships, such as customers linked to transactions and products, while the data matrix encodes numerical attributes for efficient computation. For example, in a retail database, Neo4j could construct a graph with nodes representing customers, products, and orders, and edges denoting purchases or views, storing the graph in a sharded cluster for scalability. Concurrently, SciPy could generate a sparse matrix of transaction amounts, optimized for memory using compressed sparse row format, and stored in Apache Parquet files on a Hadoop Distributed File System (HDFS). A GraphQL API might facilitate efficient querying of relationships, while Apache Airflow could orchestrate the transformation workflow, scheduling tasks across a Kubernetes cluster. The resulting structured format, cached in Redis for rapid access, prepares the data for advanced optimization algorithms, ensuring compatibility with quantum computing frameworks and enabling precise join strategy computations.

The structured data is processed using quantum annealing to identify an optimal join strategy by iteratively sampling a solution space in a quantum superposition state and converging on a minimum energy state (206). This step utilizes a quantum computing processor, such as a D-Wave Advantage system with 5,000 qubits or an IBM Quantum System One, executing Qiskit or D-Wave's Ocean SDK to encode the relational graph as a quadratic unconstrained binary optimization (QUBO) problem. For instance, in a financial institution, this could optimize joins between customer account tables and transaction logs, minimizing query execution time for a dataset with 10 million records. The quantum annealing module initializes parameters, including annealing schedules, qubit coupling strengths, and solution space boundaries, then samples thousands of configurations across 100 iterations, leveraging quantum tunneling to escape local minima. A hybrid solver combining quantum and classical computation, implemented with D-Wave's Hybrid Solver Service, could enhance scalability. The optimal join strategy, stored in a PostgreSQL metadata table, reduces computational complexity for multi-table joins, significantly enhancing performance in data-intensive applications.

The optimal join strategy is analyzed to generate a correlation matrix identifying relationships between columns and tables, updating the relational graph to highlight frequent access patterns specific to join operations (208). For example, in a banking system, R with the corrr package could compute Pearson correlations between loan account accesses, savings account queries, and transaction types, producing a matrix with 10,000 entries for a large dataset. NetworkX could update the relational graph with weighted edges, assigning higher weights to patterns like customers querying loan statuses alongside credit card transactions, and store the graph in ArangoDB for multi-model access. Real-time updates, processed by Apache Flink with a 1-second window, could incorporate recent query trends, logged in a Cassandra cluster for durability. Graph analytics, using Gephi for visualization, could identify clusters of related tables, stored in a metadata repository for downstream use. This analysis provides actionable insights into data access patterns, guiding the prioritization of data blocks in subsequent steps.

A swarm artificial intelligence module initializes a population of artificial ants, each representing a data block in the relational database, such as a partition of customer records or transaction logs, assigning random starting blocks and initial pheromone trails based on historical query patterns (210). For instance, in an online retail system, a Java-based ant colony optimization library like ACOJava could simulate 10,000 ants across a dataset with 1 billion records, with each ant representing a 1 GB block of product or customer data. Initial pheromone trails, reflecting query frequencies for electronics products, could be stored in a Redis cache with a 1-hour TTL for freshness. The initialization process, orchestrated by Apache Mesos for resource allocation, could leverage historical query logs in Snowflake to set trail weights, ensuring alignment with user behavior. This step establishes a bio-inspired framework for predicting access patterns, harnessing collective intelligence to identify high-relevance data blocks efficiently.

The ants navigate through data blocks by calculating transition probabilities based on pheromone trails to select the next block in real-time, balancing exploration of new blocks with targeting of known high-value paths (212). For example, in an e-commerce database, a probabilistic model implemented in Apache Flink could compute probabilities for 100,000 blocks, prioritizing those containing popular product categories like smartphones. Transition probabilities, stored in DynamoDB with a 1-minute update cycle, could be calculated using a softmax function in TensorFlow, ensuring numerical stability. The navigation process, running on a 50-node Spark cluster, could process 1 million transitions per second, updating trails in real-time. A feedback loop, implemented with RabbitMQ, could adjust probabilities based on query surges, ensuring adaptability to dynamic patterns like seasonal sales. This navigation optimizes data retrieval by focusing computational resources on frequently accessed blocks.

The ants converge on high-relevance data blocks, incrementing a convergence map for each visited block and reinforcing pheromone trails for blocks exceeding a query frequency threshold, such as those accessed in over 80% of queries (214). For instance, in a banking system, ants could cluster on blocks containing recent transaction data for high-net-worth clients, with convergence tracked in an Elasticsearch index with 10 shards for scalability. The swarm module, using Scala with Akka for concurrent processing, could reinforce trails for 1,000 high-relevance blocks, storing updates in a Kafka topic for durability. Convergence metrics, visualized in Kibana, could highlight blocks with over 1,000 visits per minute, ensuring focus on critical data. A threshold algorithm, implemented in Go, could dynamically adjust the frequency cutoff based on query volume, logged in Splunk for auditing. This convergence distills complex access patterns into actionable insights, prioritizing blocks for prefetching to enhance query performance.

The high-relevance blocks are ranked to select prefetch blocks for data retrieval during join operations, sorting blocks by convergence scores to optimize resource allocation (216). For example, in a retail database, a Python script with NumPy could rank 10,000 blocks containing top-selling product data, storing scores in a PostgreSQL table with a B-tree index for fast retrieval. Apache Ignite could cache the top 100 prefetch blocks in a distributed memory grid, ensuring sub-millisecond access times. The ranking algorithm, running on a Kubernetes cluster with 20 nodes, could process 1 million scores per second, using a heap-based priority queue for efficiency. A monitoring system, built with Prometheus, could track cache hit rates, ensuring prefetch blocks align with query demands. This ranking step minimizes disk I/O by preloading critical data, reducing query execution time significantly.

A genetic algorithm estimates join selectivity by generating and evolving a population of candidate solutions, evaluating fitness by comparing predicted record counts to historical join outcomes stored in the relational database (218). For instance, in an order processing system, the DEAP library in Python could evolve 500 solutions for customer-order joins, each representing a selectivity estimate, using a MySQL table with 1 billion historical join records. The algorithm applies selection, crossover, and mutation operations, running on a Kubernetes cluster with 50 GPU-enabled nodes for parallel processing. Fitness evaluation, implemented with scikit-learn, could use mean squared error to assess prediction accuracy, logging results in Datadog for monitoring. The population evolves over 100 generations, stored in a MongoDB collection for persistence. This estimation predicts the proportion of matching records, guiding resource allocation for efficient join operations.

The expected number of records resulting from a join operation is calculated based on the join selectivity to allocate server resources, such as CPU threads and memory (220). For example, in a banking database, a Java Spring Boot application could compute expected counts for a join producing 50,000 records, triggering Kubernetes to allocate 16 GB RAM and 8 CPU cores. The calculation, using Apache Commons Math for statistical precision, could process 10,000 estimates per second, storing results in a Redis queue for orchestration. A resource manager, built with Nomad, could dynamically adjust allocations based on system load, monitored via Grafana. This step ensures efficient query planning, preventing resource bottlenecks and optimizing performance for large-scale joins.

A learned index structure is created based on the correlation matrix and prefetch blocks to facilitate real-time data retrieval, integrating patterns to align with frequent queries (222). For instance, in an e-commerce system, C++ with the Learned Index Structures library could build compact indexes mapping customer IDs to order records, stored on NVMe SSDs with 3.2 TB capacity for low-latency access. The index, occupying 1% of traditional B-tree storage, could support 1 million lookups per second, using RocksDB for persistence. A construction pipeline, orchestrated by Apache Airflow, could integrate correlation data from Cassandra and prefetch blocks from Ignite, ensuring coherence. This step enhances retrieval speed, enabling sub-millisecond query responses for high-traffic applications.

The learned index structure is tuned based on real-time query performance metrics to maintain retrieval efficiency, adjusting entries to reflect changing query patterns (224). For example, in SQL Server, automated tuning advisors could reconfigure indexes using Extended Events data, with PowerShell scripts processing 10,000 metrics per minute. In a retail database, this might adjust indexes for high-traffic product queries during Black Friday sales, logged in Splunk for auditing. The tuning process, running on a 20-node Kubernetes cluster, could use reinforcement learning in PyTorch to optimize index configurations, stored in a PostgreSQL metadata table. A feedback loop, implemented with NATS, could trigger retuning every 10 minutes, ensuring adaptability to dynamic workloads.

A learned Bloom filter is trained using historical join data to reduce false positives in join candidate selection, minimizing unnecessary record processing (226). For instance, in an order system, scikit-learn could train a filter on 1 billion customer-order join outcomes, implemented in C for low-latency filtering at 1 million records per second. The filter, stored in RocksDB with 100 GB capacity, could achieve a 0.1% false positive rate, validated with Apache JMeter. Training data, sourced from a Snowflake data warehouse, could be preprocessed with Apache NiFi for quality. This training enhances join efficiency, critical for large-scale operations in data-intensive environments.

The trained Bloom filter is applied to filter records in real-time during join operations, excluding non-matching records to streamline processing (228). For example, in a banking database, a Rust-based implementation could filter account-transaction joins, processing 10 million records per second, integrated with PostgreSQL's query executor. The application, running on a 50-node Kubernetes cluster, could use RDMA for low-latency data transfer, logging performance in Prometheus. A circuit breaker, built with Hystrix, could handle filter overloads, ensuring robustness. This step reduces computational overhead, enabling efficient execution of complex joins.

Data pages are predicted for preloading into cache memory based on historical access patterns to reduce input/output wait times, ensuring rapid data access (230). For instance, in a financial system, a TensorFlow LSTM model could predict transaction page accesses for 1 million daily queries, preloading 1 TB of pages into Memcached. The model, trained on Parquet-formatted access logs in S3, could run on a 10-GPU cluster with NVIDIA A100s, achieving 99% prediction accuracy. A prediction pipeline, orchestrated by Kubeflow, could update models hourly, monitored via Grafana. This prediction minimizes disk I/O, critical for maintaining performance during peak query periods.

The sequence of join operations is optimized by estimating result sizes based on join selectivity to minimize intermediate record counts, enhancing query performance (232). For example, in MySQL, a custom query planner could prioritize joining a 10,000-row customer table before a 1 billion-row order table, using selectivity estimates from the genetic algorithm. The optimization, implemented in C++ with Boost libraries, could process 1,000 sequences per second, storing optimal plans in a query cache with Redis. A graph-based algorithm, using igraph, could compute sequences, visualized in D3.js for debugging. This step reduces computational load, enabling efficient multi-table joins.

Real-time system performance metrics, including query execution time, resource utilization, and cache hit rates, are monitored to provide insights into system health (234). For instance, in a retail database, Prometheus could collect 1 million metrics per minute via custom exporters, with Grafana dashboards visualizing latency, CPU usage, and memory allocation. Metrics, stored in InfluxDB with a 30-day retention, could be queried via SQL for analysis, logged in Splunk for compliance. A monitoring agent, built with Telegraf, could integrate with Kubernetes for auto-scaling, ensuring proactive optimization. This monitoring enables rapid detection of performance bottlenecks, guiding system adjustments.

The population of artificial ants is adapted by adjusting their number based on real-time system performance metrics, balancing computational efficiency with query demands (236). For example, a Node.js application could scale ants from 5,000 to 15,000 during a Black Friday query surge, using latency metrics from Prometheus. The adaptation, running on a 20-node Kubernetes cluster, could use a PID controller in JavaScript to stabilize ant counts, logged in Datadog for monitoring. A feedback loop, implemented with Kafka, could trigger adjustments every 30 seconds, ensuring responsiveness to dynamic workloads. This step optimizes resource usage, maintaining system performance under varying conditions.

The correlation matrix is updated in real-time with new access patterns detected during join operations, ensuring alignment with current query trends (238). For instance, in an e-commerce system, Apache Spark's MLlib could recompute correlations for 10 million product accesses, processing 1 GB per second on a 50-node cluster. Updates, stored in Cassandra with 1-second consistency, could use Scala with Akka for concurrent processing, visualized in Tableau for analytics. A streaming pipeline, built with Apache Samza, could ingest patterns from Kafka, ensuring low-latency updates. This step guides index and prefetch decisions, enhancing query efficiency.

The join selectivity estimate is refined by incrementally updating the population of candidate solutions with new historical join outcomes, improving prediction accuracy (240). For example, in a banking system, Python with River could update 500 genetic algorithm solutions using 1 million new join outcomes in PostgreSQL, processing 10,000 updates per second on a Spark cluster. Incremental learning, logged in Prometheus, could use a learning rate of 0.01, stored in MongoDB for persistence. A retraining scheduler, built with Airflow, could trigger updates hourly, ensuring adaptability to evolving data patterns. This refinement enhances resource allocation, optimizing join performance.

The learned index structure is dynamically optimized by adding new entries for frequently accessed blocks and removing outdated ones based on real-time metrics, maintaining retrieval efficiency (242). For instance, in MongoDB, Go scripts could add indexes for 1,000 new product blocks, processing 100,000 metrics per minute from Grafana. The optimization, running on a 30-node Kubernetes cluster, could use a decision tree in scikit-learn to prioritize entries, logged in Splunk for auditing. A pruning algorithm, implemented with Apache Commons, could remove 10% of outdated indexes daily, ensuring alignment with query patterns. This step enhances index performance, critical for high-traffic applications.

The Bloom filter is retrained periodically using new historical join outcomes to maintain accuracy in join candidate selection (244). For example, PyTorch could update a neural network-based filter for 1 billion order joins, triggered by a cron job every 24 hours on a 20-GPU cluster. The retrained filter, stored in LevelDB with 500 GB capacity, could achieve a 0.05% false positive rate, validated with Locust. Retraining data, sourced from Snowflake, could be preprocessed with Apache NiFi, logged in Datadog. This retraining ensures efficient join processing, minimizing computational overhead.

The page prediction model is retrained using new access patterns to improve preloading accuracy, reducing input/output wait times (246). For instance, Keras with A100 GPUs could retrain an LSTM model on 1 TB of access logs in Parquet format, running on a TensorFlow Serving cluster with 50 nodes. The model, achieving 98% accuracy, could process 1 million predictions per second, logged in Prometheus. A retraining pipeline, orchestrated by Kubeflow, could update models every 6 hours, visualized in Grafana. This retraining ensures accurate page predictions, critical for peak query performance.

The join operation sequence is refined by incorporating updated result size estimates to further minimize intermediate record counts, optimizing complex joins (248). For example, PostgreSQL's GEQO planner could re-evaluate 1,000 sequences for 10-table joins, using C++ with Boost for 1 million computations per second. Updated estimates, sourced from MongoDB, could be cached in Redis, visualized in D3.js for debugging. A refinement algorithm, built with igraph, could process 100 graphs per minute, logged in Splunk. This step enhances query efficiency, enabling high-performance multi-table joins.

The relational database is segmented across multiple nodes of a distributed system, coordinating data block access for ants to ensure scalability (250). For instance, Apache Hadoop with HDFS could segment 10 PB of customer and transaction data across 100 nodes, with ZooKeeper managing ant navigation using Java MapReduce. The segmentation, processing 1 TB per second, could use Apache Ranger for security, logged in Datadog. A coordination framework, built with Apache Helix, could balance loads, ensuring efficient distributed processing. This step enables the system to handle massive datasets, critical for global applications.

Hardware failures in the quantum computing processor or database server are handled by rerouting tasks to alternative resources, maintaining continuous operation (252). For example, Kubernetes with Helm charts could redirect quantum tasks to a backup D-Wave processor, reallocating database workloads to 50 standby nodes using a Python-based failover script. The failover, processing 1,000 reroutes per second, could use Istio for traffic management, logged in Prometheus. A health check system, built with Consul, could detect failures in 100 milliseconds, ensuring system reliability. This step guarantees uninterrupted join execution, vital for high-availability systems.

Thus, the sample flow diagram encapsulates an example process for optimizing database join operations, integrating quantum annealing, swarm intelligence, and genetic algorithms with real-time adaptability and distributed processing to deliver exceptional query performance in data-intensive environments like banking, e-commerce, and large-scale analytics platforms.

In FIGS. 3A-3D, the sequence diagram illustrates the intricate interactions among components in a system designed to optimize database join operations in a relational database, showcasing a comprehensive workflow that integrates advanced computational techniques to achieve high-performance query processing. The process begins with the Database Server initiating the workflow by requesting the Data Preparation Module to collect historical data, including customer profiles, transaction histories, product details, and query logs from the relational database (300). For example, in a banking system, this could involve the Database Server, running PostgreSQL on a high-performance server with 128 CPU cores, sending a REST API call via Spring Boot to the Data Preparation Module, which executes SQL queries to extract 10 million records. The module could use Apache Kafka to stream data from online banking platforms and branch systems, storing metadata in Elasticsearch for traceability. This sequence ensures comprehensive data capture, forming the foundation for optimization.

The Data Preparation Module responds by returning the collected data to the Database Server, which stores it in a dedicated schema for processing (302). This could be implemented using a gRPC service in Java, transferring 1 TB of data in Parquet format to a PostgreSQL table, with Apache NiFi validating data integrity. The Database Server indexes the data using B-trees for fast access, logging the transaction in Splunk for auditing. The Data Preparation Module then normalizes the historical data internally, standardizing formats, scales, and units in real-time (304). For instance, in an e-commerce platform, a Python pipeline with pandas could convert product prices to USD, impute missing customer data, and remove duplicates, processing 1 billion records on a 50-node Spark cluster. Data quality checks with Great Expectations ensure consistency, with anomalies visualized in Grafana.

The Data Preparation Module transforms the normalized data into a structured format, comprising a relational graph and a data matrix, tailored for quantum processing (306). For example, in a retail database, Neo4j could generate a graph with 100 million nodes for customers and products, while SciPy creates a sparse matrix of transaction amounts, stored in HDFS. A GraphQL API facilitates relationship queries, and Apache Airflow orchestrates the transformation across a Kubernetes cluster. The transformed data is sent to the Quantum Annealing Module for processing (308). This could use a gRPC stream in Go, transferring 500 GB of data to the Quantum Annealing Module, cached in Redis for low-latency access.

The Quantum Annealing Module requests the Quantum Computing Processor to execute the quantum annealing process, encoding the structured data as a quadratic unconstrained binary optimization problem (310). For instance, in a financial system, a D-Wave Advantage processor with 5,000 qubits could run Qiskit to sample 10,000 configurations, optimizing joins for 10 million records. The processor returns the optimal join strategy to the Quantum Annealing Module (312). This could involve a JSON response over HTTP/2, containing a join path matrix, stored in MongoDB for persistence. The Quantum Annealing Module sends the strategy to the Pattern Identification Module for analysis (314). A Protobuf message in Python could transfer the matrix, logged in Datadog for monitoring.

The Pattern Identification Module stores the correlation matrix and updated relational graph in the Database Server, identifying relationships between columns and tables (316). For example, in a banking system, R with corrr could compute correlations for 10,000 columns, storing the matrix in PostgreSQL with a GIN index. The module sends patterns to the Swarm AI Module for access prediction (318). This could use a Kafka topic in Scala, streaming 1 GB of pattern data, visualized in Kibana. The Swarm AI Module initializes an ant population, storing it in the Database Server (320). For instance, in a retail system, ACOJava could simulate 10,000 ants for 1 billion records, storing trails in Redis with a 1-hour TTL.

The Swarm AI Module navigates ants through data blocks internally, calculating transition probabilities based on pheromone trails (322). For example, in an e-commerce database, Flink could process 1 million transitions per second for 100,000 blocks, updating trails in DynamoDB. The module converges ants on high-relevance blocks, reinforcing trails for frequent queries (324). This could use Akka in Scala, clustering 1,000 blocks in Elasticsearch, with metrics in Prometheus. The ranked prefetch blocks are stored in the Database Server (326). A gRPC call in Java could store 100 blocks in PostgreSQL, cached in Ignite for speed.

The Swarm AI Module sends prefetch blocks to the Index Creation Module (328), while the Pattern Identification Module sends the correlation matrix (330). These could use REST APIs in Node.js, transferring 500 MB of data, logged in Splunk. The Genetic Algorithm Module requests historical join outcomes from the Database Server (332), which returns them (334). For example, in an order system, a GraphQL query in Python could fetch 1 billion outcomes from MySQL, returned via HTTP/2. The Genetic Algorithm Module estimates join selectivity internally, evolving 500 solutions (336), and calculates expected join records (338). This could use DEAP in Python on a 50-GPU cluster, storing results in MongoDB.

The Genetic Algorithm Module sends selectivity data to the Index Creation Module (340). A Protobuf stream in Go could transfer 100 MB of estimates, logged in Datadog. The Index Creation Module stores the learned index structure in the Database Server (342). For instance, in an e-commerce system, C++ with Learned Index Structures could store indexes on NVMe SSDs, indexed in PostgreSQL. The index is sent to the Index Tuning Module for tuning (344), using a gRPC service in Java. The tuned index is stored in the Database Server (346), via REST in Node.js, and sent to the Bloom Filter Module for join filtering (348), using Kafka in Scala.

The Bloom Filter Module trains and stores a learned Bloom filter in the Database Server (350), and applies it to join operations (352). For example, in a banking system, scikit-learn could train a filter for 1 billion joins, applied via Rust in PostgreSQL, stored in RocksDB. The Swarm AI Module sends prefetch blocks to the Page Prediction Module (354), which stores predicted pages in the Database Server (356). This could use TensorFlow in Python for predictions, stored in Memcached via gRPC. The Genetic Algorithm Module, Bloom Filter Module, and Page Prediction Module send data to the Join Order Module for optimization (358, 360, 362), using REST APIs in Go. The Join Order Module stores the optimized sequence in the Database Server (364), via GraphQL in Python.

The Monitoring Module collects system performance metrics, storing them in the Database Server (366), and sends them to the Adaptation Module (368). For instance, Prometheus could collect 1 million metrics, sent via Kafka, stored in InfluxDB. The Adaptation Module stores the adjusted ant population in the Database Server (370), using REST in Java. The Real Time Monitoring Module collects query metrics, storing them in the Database Server (372), and sends them to the Dynamic Adaptation Module (374), Pattern Update Module (378), and Selectivity Refinement Module (382). This could use gRPC in Python, with metrics in Grafana.

The Dynamic Adaptation Module stores the scaled ant population in the Database Server (376), via Protobuf in Go. The Pattern Update Module stores the updated correlation matrix (380), using Spark in Scala. The Selectivity Refinement Module stores the refined selectivity estimate (384), via REST in Node.js. The Pattern Update and Selectivity Refinement Modules send data to the Index Optimization Module (386, 388), using Kafka in Java. The Index Optimization Module stores the optimized index structure (390), via gRPC in Python, and sends it to the Bloom Filter Update Module (392), using REST in Go.

The Bloom Filter Update Module stores the retrained filter in the Database Server (394), via GraphQL in Java, and sends it to the Page Prediction Update Module (396), using Protobuf in Scala. The Page Prediction Update Module stores the retrained model (398), via REST in Python, and sends updated predictions to the Join Order Refinement Module (400), using Kafka in Node.js. The Join Order Refinement Module stores the refined sequence (402), via gRPC in Go. The Distributed Processing Module segments the database across nodes, storing the configuration in the Database Server (404), and coordinates ant navigation with the Swarm AI Module (406), using REST in Java. The Fault Tolerance Module detects and reroutes failures in the Quantum Computing Processor (408) and Database Server (410), using Kubernetes with Python scripts, logged in Prometheus.

Figure 4A:
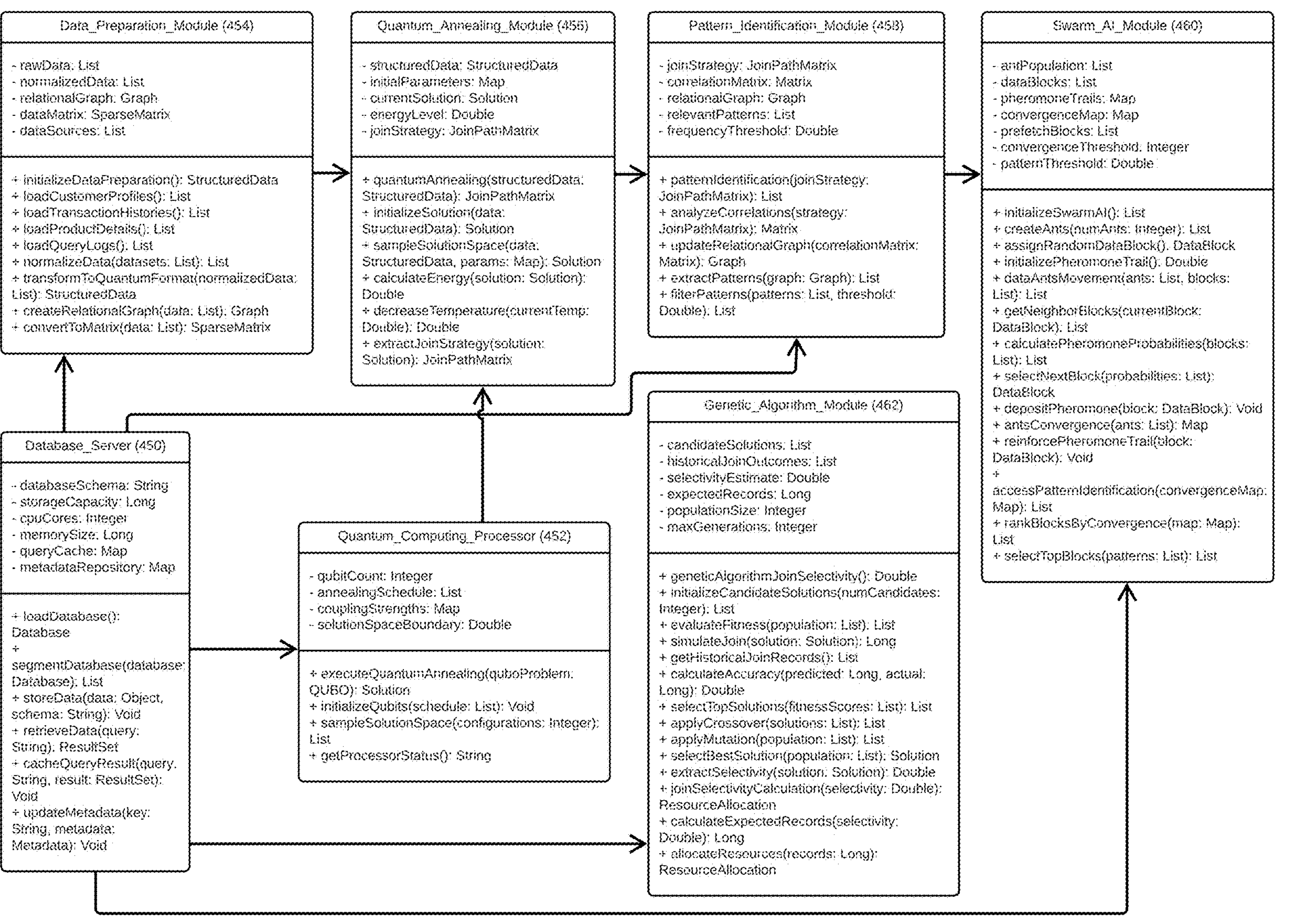
FIGS. 4A-4B collectively constitute an exemplary class diagram in accordance with one or more embodiments disclosed herein that illustrates the object-oriented structure of components for optimizing database join operations in a relational database. The diagrams detail the classes, their attributes, methods, and interconnections, representing the system's architecture for efficient query processing.
Figure 4B:
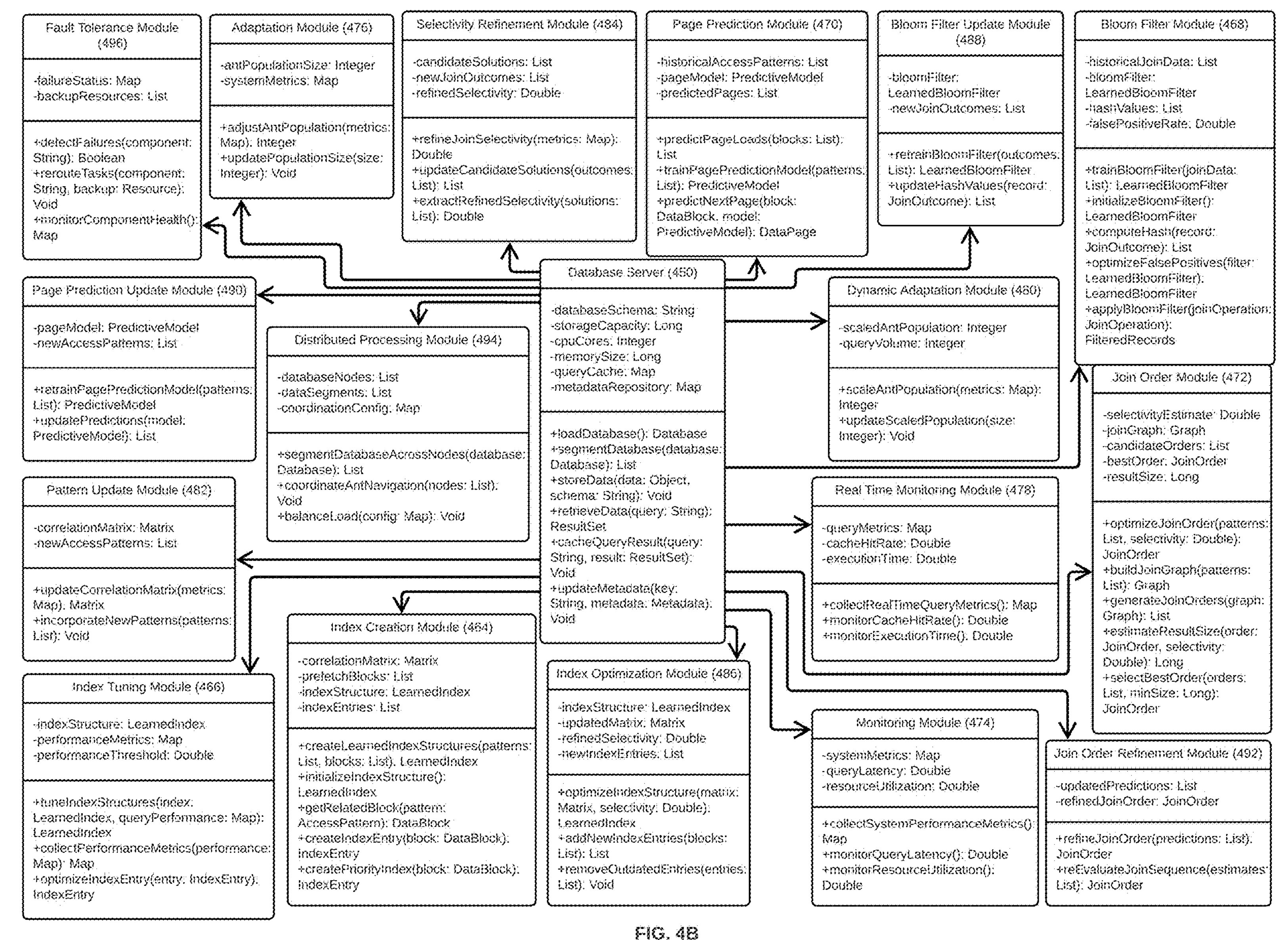

In FIGS. 4A-4B, the class diagram provides a comprehensive object-oriented representation of the system designed to optimize database join operations in a relational database, delineating the structure, attributes, methods, and relationships among components to achieve high-performance query processing. The central class, Database Server (450), serves as the primary host for the relational database, encapsulating attributes such as database schema, storage capacity, CPU cores, memory size, query cache, and metadata repository. For example, in a banking system, this class could be instantiated as a PostgreSQL server with 128 CPU cores, 2 terabytes of RAM, and a 10-petabyte storage array, managing customer and transaction data. Its methods include loading the database, segmenting it into data blocks, storing and retrieving data, caching query results, and updating metadata, implemented using Java with Spring Boot for RESTful data access and Apache Kafka for streaming updates. The Database Server (450) interacts with multiple modules, acting as the backbone for data storage and coordination.

The Quantum Computing Processor (452) class represents specialized hardware for quantum computations, with attributes like qubit count, annealing schedule, coupling strengths, and solution space boundary. In a financial institution, this could model a D-Wave Advantage processor with 5,000 qubits, configured for quadratic unconstrained binary optimization. Methods such as executing quantum annealing, initializing qubits, sampling solution spaces, and checking processor status could be coded in Python with Qiskit, interfacing via gRPC for low-latency communication. This class connects to the Quantum Annealing Module (456), enabling quantum-based join strategy optimization.

The Data Preparation Module (454) class handles data collection and preprocessing, with attributes including raw data, normalized data, relational graph, data matrix, and data sources. For an e-commerce platform, it could manage 1 billion customer purchase records, normalized using pandas in Python on a 50-node Spark cluster. Methods like initializing data preparation, loading customer profiles, transaction histories, product details, and query logs, normalizing datasets, and transforming data into quantum-compatible formats (e.g., Neo4j graphs and SciPy sparse matrices) are implemented with Apache Airflow for workflow orchestration. This class feeds structured data to the Quantum Annealing Module (456), ensuring compatibility for optimization tasks.

The Quantum Annealing Module (456) class processes structured data to identify optimal join strategies, with attributes like structured data, initial parameters, current solution, energy level, and join strategy. For example, in a retail system, it could optimize joins for 10 million order records using D-Wave's Ocean SDK. Methods include performing quantum annealing, initializing solutions, sampling solution spaces, calculating energy, adjusting annealing parameters, and extracting join strategies, coded in C++ for performance and stored in MongoDB. It connects to the Pattern Identification Module (408), passing join strategies for analysis.

The Pattern Identification Module (458) class analyzes join strategies to uncover data relationships, with attributes such as join strategy, correlation matrix, relational graph, relevant patterns, and frequency threshold. In a banking system, it could compute correlations for 10,000 columns using R's corrr package, updating graphs in ArangoDB. Methods like pattern identification, correlation analysis, graph updates, pattern extraction, and filtering are implemented with NetworkX and Apache Flink for real-time processing. This class links to the Swarm AI Module (460) and Index Creation Module (464), providing access patterns and correlation data.

The Swarm AI Module (460) class predicts data access patterns using ant colony optimization, with attributes including ant population, data blocks, pheromone trails, convergence map, prefetch blocks, convergence threshold, and pattern threshold. For instance, in an online retail system, it could simulate 10,000 ants navigating 100,000 product data blocks using ACOJava. Methods such as initializing swarm AI, creating ants, assigning data blocks, managing pheromone trails, navigating ants, converging on high-relevance blocks, and ranking prefetch blocks are coded in Scala with Akka for concurrency, storing trails in Redis. It connects to the Index Creation Module (464) and Page Prediction Module (470), supplying prefetch blocks for indexing and page preloading.

The Genetic Algorithm Module (462) class estimates join selectivity, with attributes like candidate solutions, historical join outcomes, selectivity estimate, expected records, population size, and max generations. In an order processing system, it could evolve 500 solutions for customer-order joins using DEAP in Python on a 50-GPU cluster. Methods include initializing solutions, evaluating fitness, simulating joins, calculating accuracy, applying crossover and mutation, selecting solutions, and allocating resources, with results stored in MySQL. This class interfaces with the Index Creation Module (464) and Join Order Module (472), providing selectivity data for indexing and join optimization.

The Index Creation Module (464) class builds learned index structures, with attributes such as correlation matrix, prefetch blocks, index structure, and index entries. For an e-commerce database, it could create compact indexes for 1 billion customer IDs using C++ with the Learned Index Structures library, stored on NVMe SSDs. Methods like creating index structures, initializing indexes, retrieving related blocks, and creating index entries are implemented with RocksDB for persistence. It receives inputs from the Pattern Identification Module (458), Swarm AI Module (460), and Genetic Algorithm Module (462), and connects to the Index Tuning Module (466) for further optimization.

The Index Tuning Module (466) class adjusts index structures based on performance metrics, with attributes including index structure, performance metrics, and performance threshold. In a retail system, it could reconfigure indexes for high-traffic queries using SQL Server's tuning advisors, coded in PowerShell. Methods such as tuning indexes, collecting metrics, and optimizing entries are executed on a 20-node Kubernetes cluster, with metrics in Prometheus. This class links to the Bloom Filter Module (418), passing tuned indexes for join filtering.

The Bloom Filter Module (468) class trains and applies learned Bloom filters to reduce false positives in join operations, with attributes like historical join data, bloom filter, hash values, and false positive rate. For a banking system, it could train a filter for 1 billion joins using scikit-learn, implemented in Rust for performance. Methods include training filters, initializing filters, computing hashes, optimizing false positives, and applying filters, with data in RocksDB. It connects to the Join Order Module (472), providing filtered join data.

The Page Prediction Module (470) class predicts data pages for preloading, with attributes such as historical access patterns, page model, and predicted pages. In a financial system, it could use TensorFlow LSTM models to predict transaction page accesses, preloading 1 TB into Memcached. Methods like predicting page loads, training models, and predicting next pages are run on a 10-GPU cluster, orchestrated by Kubeflow. This class links to the Join Order Module (472), supplying predicted pages for optimization.

The Join Order Module (472) class optimizes join sequences, with attributes including selectivity estimate, join graph, candidate orders, best order, and result size. For example, in MySQL, it could prioritize small-table joins using custom cost models in C++. Methods such as optimizing join orders, building join graphs, generating orders, estimating result sizes, and selecting best orders are stored in a Redis query cache. It receives inputs from the Genetic Algorithm Module (462), Bloom Filter Module (468), and Page Prediction Module (470).

The Monitoring Module (474) class tracks system performance, with attributes like system metrics, query latency, and resource utilization. In a retail database, it could use Prometheus to collect 1 million metrics, visualized in Grafana. Methods include collecting metrics, monitoring latency, and tracking utilization, implemented with Telegraf. This class connects to the Adaptation Module (476), passing metrics for adjustments.

The Adaptation Module (476) class adjusts ant population sizes, with attributes such as ant population size and system metrics. For instance, a Node.js script could scale ants based on Prometheus data, logged in Datadog. Methods like adjusting population and updating sizes are run on Kubernetes. It receives metrics from the Monitoring Module (474).

The Real Time Monitoring Module (478) class collects query metrics, with attributes including query metrics, cache hit rate, and execution time. In an e-commerce system, it could monitor cache hits using Grafana, coded in Python. Methods include collecting real-time metrics, monitoring cache hits, and tracking execution times, with data in InfluxDB. It connects to the Dynamic Adaptation Module (480), Pattern Update Module (482), and Selectivity Refinement Module (484).

The Dynamic Adaptation Module (480) class scales ant populations, with attributes like scaled ant population and query volume. For example, it could adjust 5,000 to 15,000 ants using Java Spring Boot, monitored in Prometheus. Methods include scaling populations and updating sizes, executed on a Spark cluster. It receives metrics from the Real Time Monitoring Module (478).

The Pattern Update Module (482) class updates correlation matrices, with attributes such as correlation matrix and new access patterns. In a banking system, it could recompute correlations using Spark's MLlib, stored in Cassandra. Methods like updating matrices and incorporating patterns are coded in Scala with Akka. It connects to the Index Optimization Module (486).

The Selectivity Refinement Module (484) class refines join selectivity, with attributes including candidate solutions, new join outcomes, and refined selectivity. For instance, it could update 500 solutions using River in Python, stored in MongoDB. Methods like refining selectivity and updating solutions are run on a Kubernetes cluster. It links to the Index Optimization Module (486).

The Index Optimization Module (486) class dynamically optimizes indexes, with attributes such as index structure, updated matrix, refined selectivity, and new index entries. In MongoDB, it could add indexes for new blocks using Go, monitored in Splunk. Methods include optimizing indexes, adding entries, and removing outdated ones, with a decision tree in scikit-learn. It connects to the Bloom Filter Update Module (488).

The Bloom Filter Update Module (488) class retrains Bloom filters, with attributes like bloom filter and new join outcomes. For example, it could update filters using PyTorch on a 20-GPU cluster, stored in LevelDB. Methods include retraining filters and updating hash values, triggered by cron jobs. It links to the Page Prediction Update Module (490).

The Page Prediction Update Module (490) class retrains page prediction models, with attributes such as page model and new access patterns. In a financial system, it could retrain LSTM models using Keras, run on TensorFlow Serving. Methods include retraining models and updating predictions, orchestrated by Kubeflow. It connects to the Join Order Refinement Module (492).

The Join Order Refinement Module (492) class refines join sequences, with attributes like updated predictions and refined join order. For instance, it could re-evaluate sequences in PostgreSQL's GEQO planner using C++. Methods include refining orders and re-evaluating sequences, stored in Redis. It receives predictions from the Page Prediction Update Module (490).

The Distributed Processing Module (494) class manages distributed database operations, with attributes such as database nodes, data segments, and coordination configuration. In a retail system, it could segment 10 PB of data using Hadoop with HDFS, coordinated by ZooKeeper. Methods include segmenting databases, coordinating ant navigation, and balancing loads, coded in Java MapReduce. It connects to the Swarm AI Module (460).

The Fault Tolerance Module (496) class ensures system reliability, with attributes like failure status and backup resources. For example, it could reroute tasks using Kubernetes with Helm charts, coded in Python. Methods include detecting failures, rerouting tasks, and monitoring health, logged in Prometheus. It connects to the Database Server (400), completing the system's resilient architecture.

Thus, this sample class diagram encapsulates a robust object-oriented design, integrating core processing, indexing, optimization, and monitoring components to optimize database join operations with exceptional efficiency in data-intensive environments like banking and e-commerce.

Pseudocode exemplars for implementing various aspects of this disclosure regarding optimizing database join operations using quantum annealing, swarm ai, and genetic algorithms are set forth below with explanations for reference.

```
// Layer 1: Data Distribution Learning with Quantum Annealing
FUNCTION InitializeDataPreparation( )
   SET customerData = LoadCustomerProfiles( )
   SET transactionData = LoadTransactionHistories( )
   SET productData = LoadProductDetails( )
   SET queryLogs = LoadQueryLogs( )
   SET normalizedData = NormalizeData(customerData, transactionData,
productData, queryLogs)
   SET structuredData = TransformToQuantumFormat(normalizedData)
   RETURN structuredData
END FUNCTION
FUNCTION NormalizeData(customerData, transactionData, productData, queryLogs)
   FOR EACH dataset IN (customerData, transactionData, productData, queryLogs)
      STANDARDIZE formats, scales, units IN dataset
      HANDLE missing values IN dataset
      REMOVE duplicates IN dataset
   END FOR
   RETURN combinedDataset
END FUNCTION
FUNCTION TransformToQuantumFormat(normalizedData)
   SET relationalGraph = CreateRelationalGraph(normalizedData)
   SET dataMatrix = ConvertToMatrix(normalizedData)
   RETURN {relationalGraph, dataMatrix}
END FUNCTION
FUNCTION QuantumAnnealing(structuredData)
   SET initialParameters = {thermal: HIGH, solutionSpace: FULL}
   SET currentSolution = InitializeSolution(structuredData)
   WHILE NOT Converged(currentSolution)
      SET candidateSolution = SampleSolutionSpace(structuredData,
initialParameters)
      SET energy = CalculateEnergy(candidateSolution)
      IF energy < CurrentEnergy(currentSolution)
         SET currentSolution = candidateSolution
      END IF
      UPDATE thermal = DecreaseThermal(thermal)
   END WHILE
   RETURN optimalJoinStrategy = ExtractJoinStrategy(currentSolution)
END FUNCTION
FUNCTION Patternidentification(optimalJoinStrategy)
   SET correlationMatrix = AnalyzeCorrelations(optimalJoinStrategy)
   SET relationshipGraph = UpdateRelationalGraph(correlationMatrix)
   SET dataPatterns = ExtractPatterns(relationshipGraph)
   FOR EACH pattern IN dataPatterns
      IF pattern.frequency > THRESHOLD
         ADD pattern TO relevantPatterns
      END IF
   END FOR
   RETURN relevantPatterns
END FUNCTION
// Layer 2: Access Pattern Prediction with Swarm AI
FUNCTION InitializeSwarmAI( )
   SET antPopulation = CreateAnts(NUM_ANTS)
   FOR EACH ant IN antPopulation
      SET ant.dataBlock = AssignRandomDataBlock( )
      SET ant.pheromoneTrail = InitializePheromoneTrail( )
   END FOR
   RETURN antPopulation
END FUNCTION
FUNCTION DataAntsMovement(antPopulation, dataBlocks)
   FOR EACH ant IN antPopulation
      SET currentBlock = ant.dataBlock
      SET neighborBlocks = GetNeighborBlocks(currentBlock)
      SET probabilities = CalculatePheromoneProbabilities(neighborBlocks)
      SET nextBlock = SelectNextBlock(probabilities)
      UPDATE ant.dataBlock = nextBlock
      UPDATE ant.pheromoneTrail = DepositPheromone(nextBlock)
   END FOR
   RETURN updatedAntPopulation
END FUNCTION
FUNCTION AntsConvergence(updatedAntPopulation)
   SET convergenceMap = InitializeConvergenceMap( )
   FOR EACH ant IN updatedAntPopulation
      SET block = ant.dataBlock
      INCREMENT convergenceMap[block]
      IF convergenceMap[block] > CONVERGENCE_THRESHOLD
         REINFORCE pheromoneTrail FOR block
      END IF
   END FOR
```

-continued

```
   RETURN convergenceMap
END FUNCTION
FUNCTION AccessPatternIdentification(convergenceMap)
   SET hotspotBlocks = RankBlocksByConvergence(convergenceMap)
   SET accessPatterns = InitializeAccessPatterns( )
   FOR EACH block IN hotspotBlocks
      IF block.convergenceScore > PATTERN_THRESHOLD
         ADD block TO accessPatterns
      END IF
   END FOR
   SET prefetchBlocks = SelectTopBlocks(accessPatterns)
   RETURN prefetchBlocks
END FUNCTION
// Layer 3: Join Selectivity Estimation and Learned Index Structures
FUNCTION GeneticAlgorithmJoinSelectivity( )
   SET population = InitializeCandidateSolutions(NUM_CANDIDATES)
   FOR generation = 1 TO MAX_GENERATIONS
      SET fitnessScores = EvaluateFitness(population)
      SET selectedSolutions = SelectTopSolutions(fitnessScores)
      SET newPopulation = ApplyCrossover(selectedSolutions)
      SET newPopulation = ApplyMutation(newPopulation)
      SET population = newPopulation
   END FOR
   SET bestSolution = SelectBestSolution(population)
   RETURN selectivityEstimate = ExtractSelectivity(bestSolution)
END FUNCTION
FUNCTION EvaluateFitness(population)
   SET fitnessScores = [ ]
   FOR EACH solution IN population
      SET predictedRecords = SimulateJoin(solution)
      SET actualRecords = GetHistoricalJoinRecords( )
      SET fitness = CalculateAccuracy(predictedRecords, actualRecords)
      ADD fitness TO fitnessScores
   END FOR
   RETURN fitnessScores
END FUNCTION
FUNCTION JoinSelectivityCalculation(selectivityEstimate)
   SET expectedRecords = CalculateExpectedRecords(selectivityEstimate)
   SET resourceAllocation = AllocateResources(expectedRecords)
   RETURN {expectedRecords, resourceAllocation}
END FUNCTION
FUNCTION CreateLearnedIndexStructures(relevantPatterns, prefetchBlocks)
   SET indexStructure = InitializeIndexStructure( )
   FOR EACH pattern IN relevantPatterns
      SET dataBlock = GetRelatedBlock(pattern)
      SET indexEntry = CreateIndexEntry(dataBlock)
      ADD indexEntry TO indexStructure
   END FOR
   FOR EACH block IN prefetchBlocks
      SET priorityIndex = CreatePriorityIndex(block)
      ADD priorityIndex TO indexStructure
   END FOR
   RETURN indexStructure
END FUNCTION
FUNCTION TuneIndexStructures(indexStructure, queryPerformance)
   SET performanceMetrics = CollectPerformanceMetrics(queryPerformance)
   FOR EACH indexEntry IN indexStructure
      IF performanceMetrics[indexEntry] < PERFORMANCE_THRESHOLD
         SET newEntry = OptimizeIndexEntry(indexEntry)
         REPLACE indexEntry WITH newEntry
      END IF
   END FOR
   RETURN tunedIndexStructure
END FUNCTION
// Integrative Framework
FUNCTION OptimizeJoinOperations( )
   SET structuredData = InitializeDataPreparation( )
   SET optimalJoinStrategy = QuantumAnnealing(structuredData)
   SET relevantPatterns = PatternIdentification(optimalJoinStrategy)
   SET antPopulation = InitializeSwarmAI( )
   SET updatedAntPopulation = DataAntsMovement(antPopulation, dataBlocks)
   SET convergenceMap = AntsConvergence(updatedAntPopulation)
   SET prefetchBlocks = AccessPatternIdentification(convergenceMap)
   SET selectivityEstimate = GeneticAlgorithmJoinSelectivity( )
   SET {expectedRecords, resourceAllocation} =
JoinSelectivityCalculation(selectivityEstimate)
   SET indexStructure = CreateLearnedIndexStructures(relevantPatterns,
prefetchBlocks)
   SET tunedIndexStructure = TuneIndexStructures(indexStructure,
```

-continued

```
queryPerformance)
  SET learnedBloomFilter = TrainBloomFilter(historicalJoinData)
  SET predictivePages = PredictPageLoads(prefetchBlocks)
  SET joinOrder = OptimizeJoinOrder(relevantPatterns, selectivityEstimate)
  RETURN {tunedIndexStructure, learnedBloomFilter, predictivePages, joinOrder}
END FUNCTION
FUNCTION TrainBloomFilter(historicalJoinData)
  SET bloomFilter = InitializeBloomFilter( )
  FOR EACH joinRecord IN historicalJoinData
    SET hashValues = ComputeHash(joinRecord)
    UPDATE bloomFilter WITH hashValues
  END FOR
  SET trainedFilter = OptimizeFalsePositives(bloomFilter)
  RETURN trainedFilter
END FUNCTION
FUNCTION PredictPageLoads(prefetchBlocks)
  SET pageModel = TrainPagePredictionModel(historicalAccessPatterns)
  SET predictedPages = [ ]
  FOR EACH block IN prefetchBlocks
    SET page = PredictNextPage(block, pageModel)
    ADD page TO predictedPages
  END FOR
  RETURN predictedPages
END FUNCTION
FUNCTION OptimizeJoinOrder(relevantPatterns, selectivityEstimate)
  SET joinGraph = BuildJoinGraph(relevantPatterns)
  SET candidateOrders = GenerateJoinOrders(joinGraph)
  SET bestOrder = [ ]
  SET minResultSize = INFINITY
  FOR EACH order IN candidateOrders
    SET resultSize = EstimateResultSize(order, selectivityEstimate)
    IF resultSize < minResultSize
      SET minResultSize = resultSize
      SET bestOrder = order
    END IF
  END FOR
  RETURN bestOrder
END FUNCTION
// Main Execution
FUNCTION Main( )
  SET database = LoadDatabase( )
  SET dataBlocks = SegmentDatabase(database)
  SET historicalJoinData = LoadHistoricalJoinData( )
  SET historicalAccessPatterns = LoadHistoricalAccessPatterns( )
  SET queryPerformance = InitializeQueryPerformance( )
  SET optimizationResult = OptimizeJoinOperations( )
  APPLY optimizationResult.tunedIndexStructure TO database
  APPLY optimizationResult.learnedBloomFilter TO joinOperations
  PRELOAD optimizationResult.predictivePages
  EXECUTE joinOperations WITH optimizationResult.joinOrder
END FUNCTION
```

The pseudocode provided above outlines a sample implementation of a system for optimizing database join operations, integrating quantum annealing, swarm AI, and genetic algorithms to enhance data retrieval efficiency in large-scale relational databases. The main execution begins with the 'Main' function, which initializes the database, segments it into data blocks, loads historical join and access pattern data, and tracks query performance. This function orchestrates the entire optimization process by calling the 'OptimizeJoinOperations' function, which serves as the integrative framework coordinating all layers of the system. The results, including tuned index structures, learned Bloom filters, predictive page loads, and optimized join orders, are applied to the database to execute optimized join operations.

The first layer, data distribution learning with quantum annealing, starts with the 'InitializeDataPreparation' function, which loads customer profiles, transaction histories, product details, and query logs from various sources. These datasets are passed to the 'NormalizeData' function, which standardizes formats, scales, and units, handles missing values, and removes duplicates to ensure consistency. For instance, transaction amounts in different currencies are converted to a common unit, and account types are categorized uniformly. The 'TransformToQuantumFormat' function then converts the normalized data into a relational graph and matrix, structuring it for quantum annealing by representing table relationships and data distributions in a computationally efficient format.

The 'QuantumAnnealing' function implements the quantum annealing algorithm, initializing parameters such as a high thermal and a full solution space to explore possible join strategies. It iteratively samples candidate solutions, calculating their energy to assess efficiency, and updates the current solution if a lower-energy candidate is found. The thermal decreases with each iteration, guiding the algorithm toward a global minimum that represents the optimal join strategy. This strategy, extracted as a set of table connections, minimizes retrieval time while ensuring accuracy, such as optimizing joins between customer profiles and transaction records.

The 'PatternIdentification' function analyzes the optimal join strategy to uncover correlations between columns and tables, generating a correlation matrix and updating the relational graph. It extracts patterns, such as frequent associations between loan inquiries and savings account accesses, and filters them based on a frequency threshold to identify relevant patterns. These patterns, which highlight common data relationships, guide subsequent layers by indicating which data blocks are most likely to be queried together, enabling targeted retrieval.

The second layer, access pattern prediction with swarm AI, begins with the 'InitializeSwarmAI' function, which creates a population of artificial ants, each assigned a random data block and an initial pheromone trail. These ants represent potential data blocks, such as segments of customer or transaction records, and their trails simulate historical access patterns. The 'DataAntsMovement' function governs ant navigation, where each ant evaluates neighboring blocks, calculates transition probabilities based on pheromone levels, and moves to the next block, depositing pheromones to reinforce the trail. This probabilistic movement balances exploration of new blocks with targeting of known high-value paths.

The 'AntsConvergence' function monitors ant clustering, incrementing a convergence map for each block visited. Blocks exceeding a convergence threshold receive reinforced pheromone trails, indicating high relevance for query execution. For example, blocks containing loan application records might attract many ants, signaling their priority. The 'AccessPatternIdentification' function ranks blocks by convergence scores, selecting those above a pattern threshold as hotspots. These hotspot blocks, identified as prefetch candidates, are proactively loaded into memory to reduce retrieval times, optimizing query performance for frequent access patterns.

The third layer, join selectivity estimation and learned index structures, starts with the 'GeneticAlgorithmJoinSelectivity' function, which initializes a population of candidate solutions for estimating join selectivity—the proportion of records matching a join condition. Over multiple generations, the 'EvaluateFitness' function simulates joins for each solution, comparing predicted record counts to historical data to compute accuracy scores. The algorithm selects top solutions, applies crossover to combine their features, and introduces mutations to maintain diversity, ultimately selecting the best solution to extract a precise selectivity estimate, such as predicting a 70% match rate for customer and loan records.

The 'JoinSelectivityCalculation' function uses the selectivity estimate to calculate the expected number of records resulting from a join, informing resource allocation for memory and processing power. This ensures efficient query planning, avoiding over- or under-allocation. For instance, a join expected to produce 50,000 records during peak hours triggers appropriate resource provisioning. The 'CreateLearnedIndexStructures' function designs dynamic indexes based on relevant patterns and prefetch blocks, creating compact entries that link high-priority data, such as primary account and product records, to minimize storage and maximize retrieval speed.

The 'TuneIndexStructures' function continuously adjusts these indexes based on query performance metrics, optimizing entries that fall below a performance threshold. For example, during a surge in loan inquiries, the system refines indexes to prioritize loan-related blocks, maintaining efficiency. The 'TrainBloomFilter' function enhances join candidate selection by training a Bloom filter on historical join data, computing hash values for records, and optimizing to minimize false positives, ensuring only relevant records are retrieved during joins.

The 'PredictPageLoads' function trains a model on historical access patterns to predict which data pages will be needed next, preloading them to reduce input/output wait times. For instance, pages containing transaction logs are preloaded for frequent queries, ensuring immediate access. The 'OptimizeJoinOrder' function builds a join graph from relevant patterns, generates candidate join orders, and selects the order with the smallest estimated result size based on selectivity estimates, prioritizing joins that reduce intermediate record counts for faster execution.

The 'OptimizeJoinOperations' function integrates all components, orchestrating data preparation, quantum annealing, pattern identification, swarm AI, selectivity estimation, index creation, and tuning. It also incorporates Bloom filter training, predictive page loading, and join order optimization, returning a comprehensive optimization result. This result is applied in the 'Main' function, which loads the database, segments it, and executes optimized join operations, leveraging the tuned indexes, filters, preloaded pages, and join order to achieve rapid, efficient query responses.

The pseudocode's modular design allows each function to focus on a specific task while contributing to the overall goal of optimizing join operations. By integrating quantum annealing's data distribution insights, swarm AI's access pattern predictions, and genetic algorithms' selectivity and indexing optimizations, the system addresses the complexities of large-scale databases. Its adaptability to new data patterns, dynamic index tuning, and resource-efficient strategies ensure scalability and performance, making it a robust solution for data-intensive applications.

The systems and methods described herein for optimizing database join operations through the integration of quantum annealing, swarm intelligence, and genetic algorithms offer a robust framework that can be adapted, modified, and customized in numerous ways while remaining within the spirit and scope of the disclosure. One potential modification involves altering the quantum annealing algorithm to incorporate different optimization techniques, such as simulated annealing or other heuristic methods, to explore the solution space for data distribution learning. These alternatives could be employed in scenarios where quantum computing resources are limited, allowing the system to maintain efficiency using classical computing approaches. Additionally, the parameters of the quantum annealing process, such as thermal schedules or solution space boundaries, can be customized to prioritize specific performance metrics, such as minimizing retrieval time or maximizing join accuracy, depending on the application's requirements.

The data preparation phase can be adapted to handle diverse data types beyond customer profiles, transaction histories, and product details. For instance, the system could process multimedia data, sensor data, or unstructured text from social media platforms, requiring tailored normalization and transformation techniques to ensure compatibility with quantum annealing. Customizations might include integrating advanced data cleaning algorithms to address specific noise patterns or employing domain-specific feature engineering to enhance pattern identification. Furthermore, the relational graph and matrix formats used for structuring data could be replaced with alternative representations, such as tensor-based structures or knowledge graphs, to better capture complex relationships in specialized databases, such as those used in scientific research or supply chain management.

In the swarm intelligence layer, the artificial ant model can be modified to incorporate other bio-inspired algorithms, such as particle swarm optimization or bee colony algorithms, to predict access patterns. These alternatives might offer advantages in specific contexts, such as improved convergence rates or robustness to noisy data. The pheromone trail mechanism could be customized to include additional factors, such as temporal decay rates or query priority weights, to reflect real-time changes in user behavior or system load. Moreover, the number of ants and their exploration strategies can be adjusted dynamically based on database size or query volume, optimizing computational efficiency in smaller or larger systems.

The genetic algorithm for join selectivity estimation can be adapted by substituting other evolutionary algorithms, such as differential evolution or genetic programming, to generate candidate solutions. These alternatives might provide better scalability for extremely large databases or improved accuracy for complex join conditions. Customizations could involve varying the population size, mutation rates, or crossover strategies to balance exploration and targeted attack, tailoring the algorithm to specific query types or database structures. Additionally, the fitness evaluation process could incorporate alternative metrics, such as resource consumption or query latency, to align with different performance objectives.

The creation and tuning of learned index structures offer significant opportunities for modification. Instead of relying solely on patterns from quantum annealing and swarm AI, the system could integrate external metadata, such as query execution plans or hardware specifications, to design indexes that account for specific system constraints. Alternative indexing techniques, such as hierarchical or multi-dimensional indexes, could be employed to enhance retrieval speed for particular data distributions. The tuning process could be customized to prioritize different performance metrics, such as energy efficiency or fault tolerance, by adjusting the optimization criteria based on real-time system feedback or environmental factors.

The integrative framework that combines quantum annealing, swarm AI, and genetic algorithms can be modified to include additional computational paradigms, such as deep learning or reinforcement learning, to enhance specific components. For example, a neural network could be trained to predict access patterns alongside swarm AI, providing a hybrid approach that leverages both collective intelligence and predictive modeling. Combinations of these techniques could be tailored to specific industries, such as analytics or logistics, by incorporating domain-specific constraints or data characteristics into the optimization process.

The learned Bloom filters used for join candidate selection can be replaced with other probabilistic data structures, such as cuckoo filters or quotient filters, to achieve different trade-offs between false positive rates and memory usage. Customizations might include training the filters on different subsets of historical join data or adjusting their hash functions to optimize for specific query patterns. Additionally, the system could integrate multiple filter types in a cascaded approach, where each filter refines the candidate set progressively, improving accuracy in high-stakes applications.

Predictive page loading can be adapted to use alternative prediction models, such as decision trees or time-series forecasting, to anticipate data page needs. These models could be customized to account for specific access patterns, such as seasonal trends in e-commerce or regulatory reporting cycles in banking. The preloading strategy could be modified to prioritize different criteria, such as minimizing disk I/O or maximizing cache hit rates, depending on the system's hardware configuration. Combinations with other caching techniques, such as least recently used or adaptive replacement caching, could enhance performance in dynamic environments.

Join order optimization can be modified to incorporate alternative graph-based algorithms, such as minimum spanning trees or shortest path algorithms, to determine the most efficient join sequence. These approaches could be customized to handle specific database schemas or query complexities, such as those involving recursive joins or nested queries. The system could also integrate cost-based optimization techniques, where join orders are evaluated based on estimated computational costs, allowing for fine-tuned performance in resource-constrained environments.

The system's applicability to different domains offers further opportunities for customization. In addition to banking and e-commerce, the framework could be adapted for scientific databases, social network analysis, or IoT data processing by modifying data preparation, pattern identification, and indexing strategies to suit domain-specific requirements. For instance, IoT applications might prioritize real-time streaming data, requiring adjustments to the swarm AI layer to handle continuous data updates. Combinations of domain-specific features, such as temporal analysis for time-series data or spatial indexing for geographic data, could be integrated to enhance performance.

The system can be modified to operate on distributed or cloud-based architectures, where data blocks are spread across multiple nodes. This would require adapting the quantum annealing and swarm AI algorithms to handle distributed data processing, potentially using map-reduce frameworks or federated learning techniques. Customizations might include optimizing communication protocols between nodes or prioritizing data locality to minimize latency. Such modifications would enable the system to scale to massive datasets, such as those in global financial systems or large-scale e-commerce platforms.

Another modification involves enhancing the system's adaptability to new users or data patterns. The swarm AI layer could incorporate online learning techniques to update access patterns in real time, while the genetic algorithm could use incremental learning to refine selectivity estimates as new queries are processed. These adaptations would ensure that the system remains effective in dynamic environments, such as rapidly growing databases or systems with high user turnover. Combinations with anomaly detection algorithms could further improve robustness by identifying and adapting to unusual query patterns.

The system could be customized to support different database management systems, such as NoSQL or graph databases, by modifying the data preparation and indexing components to align with their data models. For example, in a graph database, the relational graph used in quantum annealing could be replaced with a native graph structure, while the swarm AI layer could navigate graph edges instead of data blocks. These adaptations would broaden the system's applicability, enabling it to optimize join-like operations in non-relational contexts.

Integration with existing database optimization tools offers another avenue for customization. The system could be combined with query optimizers, caching layers, or indexing frameworks to create a hybrid solution that leverages both the novel techniques described and established database technologies. For instance, the learned index structures could be integrated with traditional B-tree indexes to provide a fallback mechanism, ensuring reliability in edge cases. Such combinations would allow the system to be deployed in legacy systems with minimal disruption.

The system's resource efficiency can be further customized by optimizing for specific hardware platforms, such as GPUs or TPUs, to accelerate quantum annealing or genetic algorithm computations. Modifications might include parallelizing the swarm AI layer to leverage multi-core processors or optimizing memory usage in the index creation process to suit low-resource environments. These customizations would enable the system to operate in diverse hardware ecosystems, from high-performance servers to edge devices.

While the present technology has been explained through what are currently regarded as the most practical and preferred embodiments, it should be recognized that these specifics are provided solely for illustrative purposes, and the disclosure is not confined to the particular descriptions and embodiments outlined. Instead, it is intended to encompass modifications and comparable arrangements that fall within the spirit and scope of the appended claims. For instance, it is understood that the present technology envisions the possibility of integrating, where feasible, one or more elements from any given embodiment with one or more elements from any other embodiment. This flexibility ensures that the system can be tailored to a wide range of applications, database structures, and computational environments while preserving its core objective of optimizing join operations through advanced computational techniques.

The invention claimed is:

1. A method for optimizing database join operations in a relational database on a database server, comprising:

collecting, by a data preparation module executing on the database server, historical data including customer profiles, transaction histories, product details, and query logs from the relational database;

normalizing, by the data preparation module, the historical data to standardize formats, scales, and units across datasets in real-time;

transforming, by the data preparation module, the normalized historical data into a structured format including a relational graph and a data matrix for quantum processing;

processing, by a quantum annealing module executing on a quantum computing processor communicatively coupled to the database server, the structured format to identify an optimal join strategy by iteratively sampling a solution space in a quantum superposition state and converging on a minimum energy state;

analyzing, by a pattern identification module executing on the database server, the optimal join strategy to generate a correlation matrix identifying relationships between columns and tables in the relational database;

initializing, by a swarm artificial intelligence module executing on the database server, a population of artificial ants, wherein each artificial ant represents a data block in the relational database;

navigating, by the swarm artificial intelligence module, the population of artificial ants through data blocks by following pheromone trails to identify high-relevance data blocks in real-time;

converging, by the swarm artificial intelligence module, the population of artificial ants on the high-relevance data blocks to reinforce the pheromone trails based on query frequency;

ranking, by the swarm artificial intelligence module, the high-relevance data blocks to select prefetch blocks for data retrieval during join operations;

estimating, by a genetic algorithm module executing on the database server, a join selectivity by generating and evolving a population of candidate solutions to predict a proportion of records matching a join condition in the relational database;

calculating, by the genetic algorithm module, an expected number of records resulting from a join operation based on the join selectivity to allocate server resources;

creating, by an index creation module executing on the database server, a learned index structure based on the correlation matrix and the prefetch blocks to facilitate real-time data retrieval; and tuning, by an index tuning module executing on the database server, the learned index structure based on real-time query performance metrics to maintain retrieval efficiency during join operations.

2. The method of claim 1, wherein normalizing the historical data includes handling missing values and removing duplicates from the customer profiles, transaction histories, product details, and query logs in real-time on the database server.

3. The method of claim 2, wherein transforming the normalized historical data includes generating the relational graph to represent relationships between the customer profiles, the transaction histories, and the product details for processing by the quantum computing processor.

4. The method of claim 3, wherein processing the structured format includes initializing parameters including a quantum thermal and a solution space boundary for the quantum annealing module to optimize join strategy identification.

5. The method of claim 4, wherein analyzing the optimal join strategy includes updating the relational graph with the correlation matrix to identify frequent access patterns specific to join operations in the relational database.

6. The method of claim 5, wherein initializing the population of artificial ants includes assigning each artificial ant a random data block and an initial pheromone trail based on historical query patterns in the relational database.

7. The method of claim 6, wherein navigating the population of artificial ants includes calculating transition probabilities based on the pheromone trails to select a next data block for each artificial ant in real-time during join operations.

8. The method of claim 7, wherein converging the population of artificial ants includes incrementing a convergence map for each visited data block and reinforcing the pheromone trails for data blocks exceeding a convergence threshold determined by query frequency.

9. The method of claim 8, wherein estimating the join selectivity includes evaluating a fitness of each candidate solution by comparing predicted record counts to historical join outcomes stored in the relational database.

10. The method of claim 9, further comprising:

training, by a Bloom filter module executing on the database server, a learned Bloom filter using historical join data to reduce false positives in join candidate selection during join operations; and applying, by the Bloom filter module, the learned Bloom filter to filter records in real-time during the join operation on the database server.

11. A method for optimizing database join operations in a relational database on a database server, comprising:

collecting, by a data preparation module executing on the database server, historical data including customer profiles, transaction histories, product details, and query logs from the relational database;

normalizing, by the data preparation module, the historical data to standardize formats, scales, and units across datasets in real-time, wherein normalizing includes handling missing values and removing duplicates;

transforming, by the data preparation module, the normalized historical data into a structured format including a relational graph representing relationships between the customer profiles, the transaction histories, and the product details, and a data matrix for quantum processing;

processing, by a quantum annealing module executing on a quantum computing processor communicatively coupled to the database server, the structured format to identify an optimal join strategy by iteratively sampling a solution space in a quantum superposition state with initialized parameters including a quantum thermal and a solution space boundary, and converging on a minimum energy state;

analyzing, by a pattern identification module executing on the database server, the optimal join strategy to generate a correlation matrix identifying relationships between columns and tables in the relational database, and updating the relational graph with the correlation matrix to identify frequent access patterns specific to join operations;

initializing, by a swarm artificial intelligence module executing on the database server, a population of artificial ants, wherein each artificial ant represents a data block in the relational database and is assigned a random data block and an initial pheromone trail based on historical query patterns;

navigating, by the swarm artificial intelligence module, the population of artificial ants through data blocks by calculating transition probabilities based on pheromone trails to select a next data block for each artificial ant in real-time;

converging, by the swarm artificial intelligence module, the population of artificial ants on high-relevance data blocks by incrementing a convergence map for each visited data block and reinforcing the pheromone trails for data blocks exceeding a convergence threshold determined by query frequency;

ranking, by the swarm artificial intelligence module, the high-relevance data blocks to select prefetch blocks for data retrieval during join operations;

estimating, by a genetic algorithm module executing on the database server, a join selectivity by generating and evolving a population of candidate solutions, evaluating a fitness of each candidate solution by comparing predicted record counts to historical join outcomes to predict a proportion of records matching a join condition;

calculating, by the genetic algorithm module, an expected number of records resulting from a join operation based on the join selectivity to allocate server resources;

creating, by an index creation module executing on the database server, a learned index structure based on the correlation matrix and the prefetch blocks to facilitate real-time data retrieval;

tuning, by an index tuning module executing on the database server, the learned index structure based on real-time query performance metrics to maintain retrieval efficiency during join operations;

training, by a Bloom filter module executing on the database server, a learned Bloom filter using historical join data to reduce false positives in join candidate selection;

applying, by the Bloom filter module, the learned Bloom filter to filter records in real-time during the join operation;

predicting, by a page prediction module executing on the database server, data pages to preload into a cache memory of the database server based on historical access patterns to reduce input/output wait times during join operations;

optimizing, by a join order module executing on the database server, a sequence of join operations by estimating result sizes based on the join selectivity to minimize intermediate record counts;

monitoring, by a monitoring module executing on the database server, real-time system performance metrics including query latency and resource utilization during join operations; and adapting, by an adaptation module executing on the database server, the population of artificial ants by adjusting a number of the artificial ants based on the real-time system performance metrics to optimize computational efficiency.

12. A system for optimizing database join operations in a relational database, comprising:

a database server configured to host the relational database;

a quantum computing processor communicatively coupled to the database server;

a data preparation module executing on the database server configured to collect historical data including customer profiles, transaction histories, product details, and query logs from the relational database, normalize the historical data to standardize formats, scales, and units across datasets in real-time, and transform the normalized historical data into a structured format including a relational graph and a data matrix for quantum processing;

a quantum annealing module executing on the quantum computing processor configured to process the structured format to identify an optimal join strategy by iteratively sampling a solution space in a quantum superposition state and converging on a minimum energy state;

a pattern identification module executing on the database server configured to analyze the optimal join strategy to generate a correlation matrix identifying relationships between columns and tables in the relational database;

a swarm artificial intelligence module executing on the database server configured to initialize a population of artificial ants, wherein each artificial ant represents a data block in the relational database, navigate the population of artificial ants through data blocks by following pheromone trails to identify high-relevance data blocks in real-time, converge the population of artificial ants on the high-relevance data blocks to reinforce the pheromone trails based on query frequency, and rank the high-relevance data blocks to select prefetch blocks for data retrieval during join operations;

a genetic algorithm module executing on the database server configured to estimate a join selectivity by generating and evolving a population of candidate solutions to predict a proportion of records matching a join condition, and calculate an expected number of records resulting from a join operation based on the join selectivity to allocate server resources;

an index creation module executing on the database server configured to create a learned index structure based on the correlation matrix and the prefetch blocks to facilitate real-time data retrieval;

an index tuning module executing on the database server configured to tune the learned index structure based on real-time query performance metrics to maintain retrieval efficiency during join operations;

a Bloom filter module executing on the database server configured to train a learned Bloom filter using historical join data and apply the learned Bloom filter to filter records in real-time during the join operation;

a page prediction module executing on the database server configured to predict data pages to preload into a cache memory of the database server based on historical access patterns;

a join order module executing on the database server configured to optimize a sequence of join operations by estimating result sizes based on the join selectivity;

a monitoring module executing on the database server configured to monitor real-time system performance metrics during join operations; and an adaptation module executing on the database server configured to adapt the population of artificial ants based on the real-time system performance metrics.

13. The system of claim 12, wherein the data preparation module is further configured to handle missing values and remove duplicates during normalization of the historical data in real-time on the database server.

14. The system of claim 13, wherein the data preparation module is further configured to generate the relational graph to represent relationships between the customer profiles, the transaction histories, and the product details for processing by the quantum computing processor.

15. The system of claim 14, wherein the quantum annealing module is further configured to initialize parameters including a quantum thermal and a solution space boundary for processing the structured format to optimize join strategy identification.

16. The system of claim 15, wherein the pattern identification module is further configured to update the relational graph with the correlation matrix to identify frequent access patterns specific to join operations in the relational database.

17. The system of claim 16, wherein the swarm artificial intelligence module is further configured to assign each artificial ant a random data block and an initial pheromone trail based on historical query patterns in the relational database.

18. The system of claim 17, wherein the swarm artificial intelligence module is further configured to calculate transition probabilities based on the pheromone trails to select a next data block for each artificial ant in real-time during join operations.

19. The system of claim 18, wherein the swarm artificial intelligence module is further configured to increment a convergence map for each visited data block and reinforce the pheromone trails for data blocks exceeding a convergence threshold determined by query frequency during join operations.

20. The system of claim 19, further comprising:

a real-time monitoring module executing on the database server configured to collect real-time query performance metrics including query execution time, resource utilization, and cache hit rates from the relational database during execution of the join operation;

a dynamic adaptation module executing on the database server configured to adjust the population of artificial ants by increasing or decreasing a number of the artificial ants based on a query volume detected by the real-time monitoring module to maintain computational efficiency;

a pattern update module executing on the database server configured to update the correlation matrix in real-time by incorporating new access patterns detected by the real-time monitoring module during execution of the join operation;

a selectivity refinement module executing on the database server configured to refine the join selectivity estimate by incrementally updating the population of candidate solutions with new historical join outcomes collected by the real-time monitoring module;

an index optimization module executing on the database server configured to dynamically modify the learned index structure by adding new index entries for frequently accessed data blocks identified by the pattern update module and removing outdated index entries based on the real-time query performance metrics;

a Bloom filter update module executing on the database server configured to retrain the learned Bloom filter periodically using the new historical join outcomes to maintain accuracy in join candidate selection during join operations;

a page prediction update module executing on the database server configured to retrain a page prediction model using the new access patterns to improve accuracy of data page preloading into the cache memory of the database server;

a join order refinement module executing on the database server configured to re-evaluate the sequence of join operations by incorporating updated result size estimates from the selectivity refinement module to further minimize intermediate record counts during execution of the join operation;

a distributed processing module executing on the database server configured to segment the relational database across multiple nodes of a distributed database system and coordinate data block access for the population of artificial ants across the multiple nodes; and a fault tolerance module executing on the database server configured to detect failures in the quantum computing processor or the database server and reroute processing tasks to alternative hardware resources to ensure continuous execution of the join operation.

* * * * *